(12) United States Patent
Satz et al.

(10) Patent No.: US 12,467,991 B2
(45) Date of Patent: Nov. 11, 2025

(54) MAGNETORESISTIVE MAGNETIC FIELD SENSOR HAVING A FREELY SELECTABLE MAGNETIC OPERATING POINT

(71) Applicant: Infineon Technologies AG, Neubiberg (DE)

(72) Inventors: Armin Satz, Villach (AT); Juergen Zimmer, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 145 days.

(21) Appl. No.: 18/504,527

(22) Filed: Nov. 8, 2023

(65) Prior Publication Data

US 2024/0151786 A1   May 9, 2024

(30) Foreign Application Priority Data

Nov. 9, 2022 (DE) .......................... 102022211881.2

(51) Int. Cl.
*G01R 33/09* (2006.01)
*G01R 33/00* (2006.01)
*H10N 50/10* (2023.01)

(52) U.S. Cl.
CPC ....... *G01R 33/098* (2013.01); *G01R 33/0005* (2013.01); *G01R 33/0023* (2013.01); *G01R 33/093* (2013.01); *H10N 50/10* (2023.02)

(58) Field of Classification Search
CPC .............. G01R 33/0005; G01R 33/098; G01R 33/0023; G01R 33/093; G01R 33/096
See application file for complete search history.

(56) References Cited

U.S. PATENT DOCUMENTS

2023/0066027 A1\* 3/2023 Cuchet ................. G01R 33/098

FOREIGN PATENT DOCUMENTS

| DE | 102017129346 A1 | 6/2018 |
| DE | 102021110733 A1 | 10/2022 |
| WO | 2016083420 A1 | 6/2016 |

\* cited by examiner

*Primary Examiner* — Alesa Allgood
(74) *Attorney, Agent, or Firm* — Harrity & Harrity, LLP

(57) ABSTRACT

Disclosed herein is a magnetoresistive magnetic field sensor which, inter alia, includes four magnetoresistive elements arranged in a Wheatstone full bridge circuit. A first magnetoresistive element and a second magnetoresistive element, which respectively have an inverse behavior in relation to a change in conductance, are arranged in a first half bridge. A third magnetoresistive element and a fourth magnetoresistive element, which respectively have an inverse behavior in relation to a change in conductance, are arranged in a second half bridge. At least two of the four magnetoresistive elements have different conductance values when no external magnetic field is present. In each case, two of the four magnetoresistive elements have the same conductance if an external magnetic field with a predefined magnetic field strength is present.

14 Claims, 13 Drawing Sheets

Free layer (FL)
Barrier layer (BL)
Pinned layer (PL)
Antiferromagnetic layer (NAF)

MAGNETORESISTIVE MAGNETIC FIELD SENSOR HAVING A FREELY SELECTABLE MAGNETIC OPERATING POINT

CROSS-REFERENCE TO RELATED APPLICATION

This application claims priority to German Patent Application No. 102022211881.2 filed on Nov. 9, 2022, the content of which is incorporated by reference herein in its entirety.

BACKGROUND

A magnetoresistive magnetic field sensor comprises a plurality of magnetoresistive sensor elements, the conductance values or resistance values of which change in response to an external magnetic field present.

BRIEF DESCRIPTION OF THE DRAWINGS

A few example implementations are illustrated by way of example in the drawing and explained below. In the figures.

DETAILED DESCRIPTION

Figure 1:
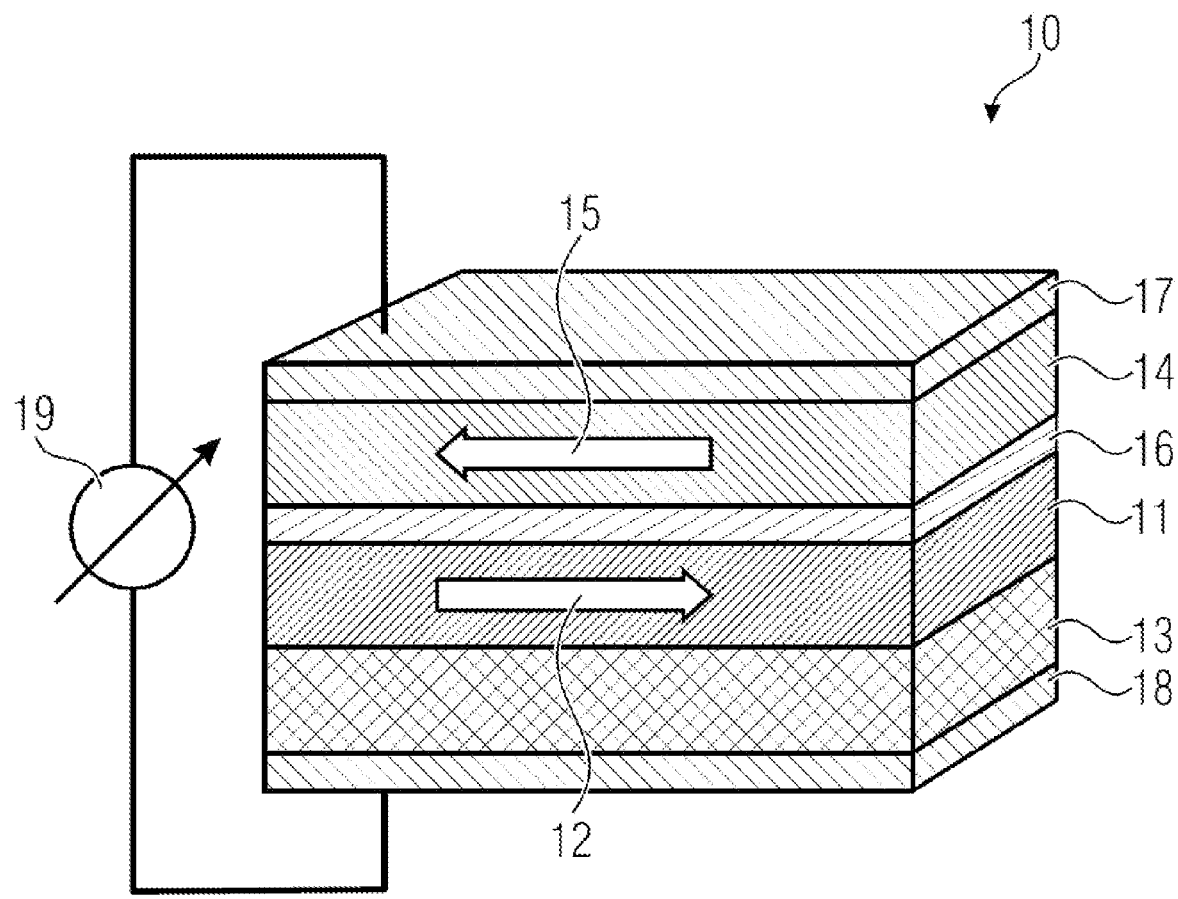
FIG. 1 shows a schematic structure of a magnetoresistive element using the example of a TMR stack.

Example implementations are described in more detail hereinbelow with reference to the figures, with elements that have the same or similar function being provided with the same reference signs.

Method steps depicted or described within the scope of the present disclosure may also be carried out in a sequence that differs from the depicted or described one. Moreover, method steps that relate to a particular feature of a device are able to be exchanged with this feature of the device, this also applying the other way round.

To the extent this disclosure refers to conductance, this should be understood to mean electrical conductance. Since the electrical conductance is defined as the reciprocal of the electrical resistance, it is understood that the electrical resistance can be used accordingly synonymously for the electrical conductance within this disclosure. To the extent that reference is made to a change in conductance, this should simultaneously also be understood to mean the reciprocal change in resistance.

In the magnetoresistive magnetic field sensor presented here, the magnetic and/or electrical operating point can be shifted in a simple and cost-efficient manner, with the result that the respective operating point is at a magnetic field strength not equal to zero ($B \neq 0$ T).

Magnetoresistive sensors are also referred to as xMR sensors for short. By way of example, these include TMR (tunnel magnetoresistance) sensors, AMR (anisotropic magnetoresistance) sensors, GMR (giant magnetoresistance) sensors, CMR (colossal magnetoresistance) sensors, and the like.

In principle, the electrical resistance or conductance of magnetoresistive sensors changes when the sensor is exposed to magnetic field. In principle, xMR sensors in this case recognize the field strength parallel to a reference direction. This is implemented by way of a resistance-based measurement using different magnetoresistive sensor elements.

A TMR sensor, which is based on the principle of a magnetic tunnel resistance, is presented as an example of an xMR sensor. A magnetic tunnel resistance is based on a magnetoresistive effect which occurs in magnetic tunnel junctions (so-called MTJs). In the simplest case, an MTJ comprises two ferromagnetic layers (FMLs), for example made of CoFe. Situated between the two ferromagnetic layers is a tunnel barrier (TB) layer, for example made of $Al_2O_3$ or MgO. If the tunnel barrier is thin enough, typically a few nanometers or thinner, then electrons can "tunnel" from one ferromagnetic layer to the other ferromagnetic layer through the tunnel barrier. This state is forbidden in classical physics, which is why the principle of magnetic tunnel resistance is a purely quantum mechanical phenomenon.

Like in the case of the GMR effect, a layer made of an antiferromagnet is arranged adjacently to one of the two ferromagnetic layers. The antiferromagnetic layer serves to fix the magnetization direction of the directly adjacent ferromagnetic layer in one direction, with the result that its fixed magnetization direction is not modifiable by external fields. This ferromagnetic layer directly adjacent to the antiferromagnetic layer is therefore also referred to as a pinned layer (PL). By contrast, the upper ferromagnetic layer which is not directly adjacent to the antiferromagnetic layer is not pinned, with the result that its magnetization direction can follow an external magnetic field. The magnetization direction of this non-pinned ferromagnetic layer is therefore freely rotatable, which is why this ferromagnetic layer is also referred to as a free layer (FL).

By way of example, the magnetization direction of the free layer can be rotated using an external magnetic field. In this case, the orientation or magnetization direction of the free layer relative to the pinned layer determines the conductance or the resistance of the tunnel contact. If the magnetization direction of the free layer is parallel to the magnetization direction of the pinned layer, then electrons can tunnel through the tunnel barrier more easily, as a result of which the tunnel junction (MTJ) has a higher conductance or lower resistance. By contrast, if the magnetization direction of the free layer is directed opposite, which is to say antiparallel, to the magnetization direction of the pinned layer, then the electrons are no longer able to tunnel through the tunnel barrier as easily, whereby the resistance of the tunnel junction (MTJ) is increased or its conductance is decreased.

For the aforementioned reasons, xMR sensors can be used for example as sensors that measure linear distances or else as angle sensors (360°), wherein the orientation of the external magnetic field can be determined based on the conductance of the MTJ. In this case, the captured raw signals are made available as differential output signals for processing by a microcontroller.

If the free layer of the MTJ has an intrinsic restoring force for its magnetization, for example by way of an impressed magnetic anisotropy, then the sensor can be used to detect a field strength of an externally applied magnetic field. By way of example, such a magnetic anisotropy can be impressed by a bias field or else by a shape anisotropy initiated by way of the structure shape. This anisotropy then leads to the magnetization of the free layer changing with increasing strength of the external magnetic field and taking its defined initial state after the external magnetic field is switched off. As a result, the conductance changes linearly with the external magnetic field, and this can be used to measure the external magnetic field strength. A further option for providing a defined ground state lies in the use of a free layer geometry which forces the formation of a vortex magnetization of the free layer for energetic reasons, as explained in detail hereinbelow.

In contrast to AMR and GMR sensors, the current flow direction in the TMR variants is not horizontal in the layer plane but vertical. This is also referred to as a CPP (current perpendicular to the plane) configuration Moreover, xMR-based technologies have the advantage over silicon-based Hall elements of a signal-to-noise ratio which has been increased by a factor of 100. This advantage allows the bandwidth of the TMR-based magnetic field sensor to be increased, and only this allows highly precise and fast measurements. On account of the high output voltage of the underlying bridge circuit, a further signal amplification can be largely dispensed with in the case of TMR sensors. As a result, microcontroller architectures available at the system level can directly evaluate the TMR sensor signals and very fast reaction times can be achieved.

Conventional xMR sensors have a Wheatstone full bridge circuit, in which four identical tunnel junctions are interconnected in two respective half bridges. A respective analog output signal can be tapped at each half bridge. In the case of a differential measurement, these two output signals are combined with one another in order to obtain a differential output signal.

Four xMR elements which have identical conductance values without an externally applied field are used to obtain a balanced Wheatstone measurement bridge. In the case of an externally applied field, two respectively opposing xMR elements have an inverted behavior in each case, which is to say they increase and decrease their conductance respectively. Consequently, the presence of an individual magnetic field component leads to a differential output signal.

In the case of such a Wheatstone bridge configuration with four identical xMR elements, the xMR sensor is always in its idle state at B=0 T, which is to say the magnetic operating point of xMR sensors is always at B=0 T. In general, the operating point is defined as the idle state of the xMR sensor if no signal is present, which is to say when no external magnetic field prevails (B=0 T).

Since the four xMR elements are identical, the Wheatstone full bridge is balanced when there is no magnetic field, which is to say the same output signal is present at both half bridges, with the result that the differential output signal is zero when there is no magnetic field. Thus, the xMR sensor is in the magnetic idle state when no external magnetic field is present (B=0 T). The magnetic operating point of xMR sensors is consequently at 0 T (tesla).

Since the four xMR elements are identical, the two half bridges moreover act as voltage dividers, across which there is a drop of in each case half the supply voltage (½*VDD) when there is no magnetic field. Thus, the xMR sensor is in the electrical idle state when no external magnetic field is present (B=0 T). Thus, the electrical operating point of xMR sensors is at ½*VDD when there is no external magnetic field (B=0 T).

Now, there are applications where different operating points are desired. For example, the intention might be to shift the magnetic operating point (e.g., the field at which the same output voltage is present at both half bridges) from B=0 T to another value, for example up to B=0.1 T=100 mT, with the result that the differential output signal is zero precisely when an external magnetic field of 100 mT is present. This property is of interest for example to applications in which the change (decrease and/or increase) around an available magnetic (bias) field should be detected without a clear bridge output signal having to be processed or subtracted as a signal offset by circuitry. By way of example, the magnetic operating point can be shifted using different magnetic bias fields at the MTJs. However, such an approach is hardly performable in practice.

As an alternative or in addition, it may be desirable to shift the electrical operating point from ½*VDD to a different value, for example to ⅔*VDD. To this end, an additional ohmic resistance is for example placed into the branch between the Wheatstone full bridge and the supply voltage, or into the branch between the Wheatstone full bridge and ground. Depending on the magnitude of the ohmic resistance, the electrical operating point or the rest position of the xMR sensor can be shifted from ½*VDD to a desired value (e.g., ⅔*VDD). This ohmic resistance is therefore also referred to as a shift resistance or shift resistor.

However, the ohmic resistance reduces the electric potential across the Wheatstone measuring bridge, leading to a reduced sensitivity of the xMR sensor. There can be measurement inaccuracies as a result. Moreover, the shift resistor is an additional component which must be installed in addition to the Wheatstone full bridge, in turn increasing the complexity of the circuit and moreover representing a further potential source of defects.

It would therefore be desirable to improve magnetoresistive sensors to the effect of rendering the magnetic and/or electrical operating point thereof shiftable, without the sensitivity of the sensor suffering noticeably as a result.

This object is achieved by a magnetoresistive magnetic field sensor having the features according to the independent patent claim. Further implementations and advantageous aspects of this magnetoresistive magnetic field sensor are specified in the respective dependent patent claims.

According to the innovative concept described herein, a magnetoresistive magnetic field sensor is proposed, comprising four magnetoresistive elements, with each magnetoresistive element experiencing a respective change in conductance in response to an external magnetic field. In this case, the four magnetoresistive elements are arranged in a Wheatstone full bridge circuit, with a first magnetoresistive element and a second magnetoresistive element, which respectively have an inverse behavior in relation to a change in conductance, being arranged in a first half bridge, and with a third magnetoresistive element and a fourth magnetoresistive element, which respectively have an inverse behavior in relation to a change in conductance, being arranged in a second half bridge. The four magnetoresistive elements are dimensioned such that they have at least two different conductance values G1, . . . , G4 (e.g., (G1=G4)≠(G2=G3)) when no external magnetic field is present, which is to say when B=0 T. By way of example, at B=0 T, a first pair of magnetoresistive elements, each with the same behavior in relation to a change in conductance (e.g., the first and the fourth magnetoresistive element) may have a first common conductance (e.g., G1=G4), and a second pair of magnetoresistive elements, each with the same behavior in relation to a change in conductance (e.g., the second and the third magnetoresistive elements), may have a different second common conductance (e.g., G2=G3). It would likewise be conceivable that all four magnetoresistive elements each have different conductance values (e.g., G1 G2 G3 G4) when no external magnetic field is present, which is to say when B=0 T. However, if an external magnetic field with a predefined magnetic field strength of B≠0 T is present, then respectively two of the four magnetoresistive elements have exactly the same conductance. This means that a first pair of magnetoresistive elements with in each case an inverted behavior in relation to the change in conductance (e.g., the first and the third magnetoresistive element) and a second pair of magnetoresistive elements with in each case an inverted behavior in relation to the change in conductance (e.g., the second and the fourth magnetoresistive element) then respectively have the same conductance. However, it would also be conceivable that all four magnetoresistive elements have the same conductance in the presence of the external magnetic field with the predefined magnetic field strength of B≠0 T.

The magnetoresistive magnetic field sensor described herein can be configured as an in-plane magnetic field sensor which in particular measures a magnetic field component in a certain direction (e.g., By in the y-direction) in the chip plane. To the extent that reference is made herein to an external magnetic field with a predefined magnetic field strength, this should be understood to mean the corresponding in-plane magnetic field component (e.g., By) in particular.

In general, the principle presented herein is also valid for out-of-plane magnetic field components (e.g., Bz in the z-direction). By way of example, a sensor may have a sensitivity for out-of-plane magnetic field components, for example if the sensor has an out-of-plane magnetized free layer in combination with an out-of-plane magnetized pinned layer, in order to generate changeable output signals under out-of-plane magnetic fields. The description of the implementation explained hereinafter based on in-plane magnetic field components should therefore not be construed as restrictive.

By way of an introduction, FIG. 1 first of all shows the structure of a TMR stack 10 as an example of a magnetoresistive sensor. The TMR stack 10 may also be referred to as a tunnel barrier, MTJ (magnetic tunnel junction). The TMR stack 10 has a ferromagnetic pinned layer 11, the magnetization direction 12 of which is defined using the underlying antiferromagnetic layer 13. A ferromagnetic free layer 14 is arranged opposite. Its magnetization direction 15 has not been fixed and may follow an external magnetic field. A tunnel barrier layer 16 is arranged between the free layer 14 and the pinned layer 11. Electrodes 17, 18, to which a voltage 19 can be applied, are arranged at the outer surfaces of the TMR stack 10.

Both the free layer 14 and the pinned layer 11 are respectively magnetized in the layer plane or chip plane. The magnetization direction 15 of the free layer 14 can consequently be rotated in the layer plane by an external magnetic field. Considered from a microscopic point of view, the free layer 14 consists of many magnetic domains, the magnetization directions of which are only weakly aligned without an external field if no further magnetic forces such as magnetic anisotropies and coupling forces act on the free layer 14. The application of an external magnetic field results in an alignment of the magnetizations of these domains in the direction of the external field, and yields a mean magnetization direction 15 of the free layer 14 in the field direction. The magnetic behavior of the free layer 14, especially also in the case without an external magnetic field, depends on many factors, for example material composition (e.g., saturation magnetization), thickness, shape and area of the free layer 14.

Electrons can tunnel through the tunnel barrier 16 and bring about a current flow through the TMR stack 10 on account of the extraordinarily thin layer thickness in the nanometer range. In this case, the resistance or conductance of the TMR stack 10 is determined by the angle between the magnetization directions 15, 12 of the free layer 14 and pinned layer 11, and consequently depends on the direction and magnitude of the external magnetic field.

By way of example, magnetoresistive sensors can be used as rotary angle sensors, for the purpose of exactly determining the angle position of rotating components. By way of example, if there is a change in the direction of the external magnetic field, for example on account of a rotation of the magnetic component, then this brings about a rotation of the magnetization direction 15 in the free layer 14. Depending on the orientation of the external field, the magnetization direction 15 of the free layer 14 may have parallel or antiparallel field components in relation to the magnetization direction 12 of the pinned layer 11. An antiparallel orientation of the magnetization 15 of the free layer 14 relative to the magnetization direction 12 of the pinned layer 11 (as shown in FIG. 1) leads to a high resistance or low conductance; a parallel alignment leads to a low overall resistance or high conductance of the TMR stack 10. Orientations between these two extremals then lead accordingly to overall resistance values or conductance values therebetween.

Should the intention be to measure the strength of an externally applied magnetic field, the free layer 14 requires a restoring force which returns it back into a defined magnetization state after the external magnetic field has been switched off. An external magnetic field becoming stronger will increasingly bring about a change in the magnetization state of the free layer 14 against the restoring force and will consequently bring about a change in conductivity; this leads to a linear change in conductance with the external magnetic field strength within a specific magnetic field range. By way of example, such a restoring force can be induced by an impressed magnetic anisotropy such as a shape anisotropy. By way of example, if this shape anisotropy is set in the x-direction (e.g., by an elongate shape in the x-direction), then this represents a restoring force in relation to an externally applied y-magnetic field component.

Under certain preconditions in respect of shape, layer thickness, and lateral dimensions, a vortex magnetization may also form as a stable ground state in the free layer 14, as will still be described in detail in the further description. An advantage of the vortex magnetization consists inter alia in it having a restoring force in any desired in-plane magnetic field direction.

Figure 2:
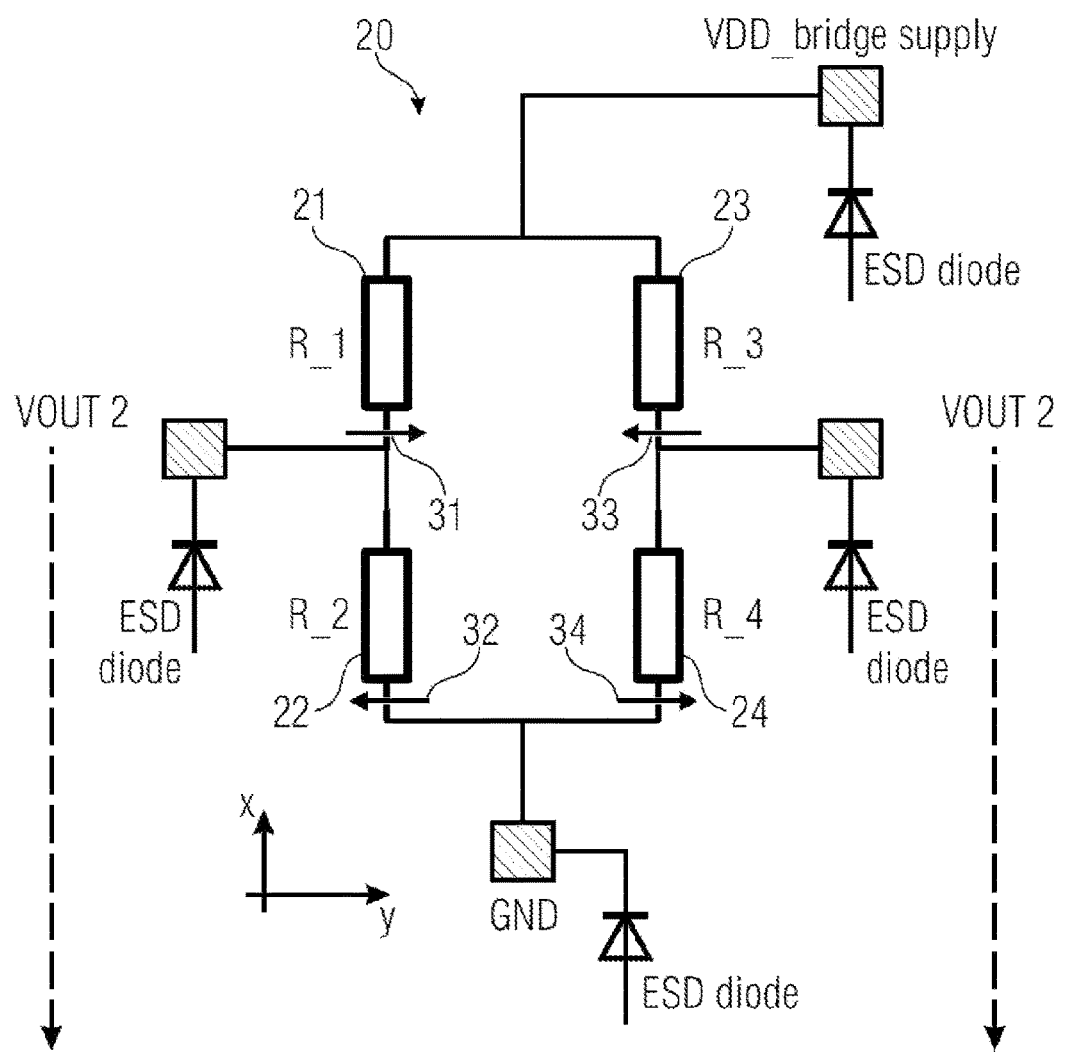
FIG. 2 shows an equivalent circuit diagram for a conventional magnetoresistive sensor in a Wheatstone full bridge configuration.

FIG. 2 shows an equivalent circuit diagram of a TMR magnetic field sensor 20 with four identical TMR stacks 21, 22, 23, 24, which are interconnected in a Wheatstone full bridge configuration. The TMR stacks 21, 22, 23, 24 may also be referred to as TMR sensor elements, or simply as sensor elements. The four TMR sensor elements 21, 22, 23, 24 arranged in the Wheatstone bridge together form a magnetoresistive sensor.

The first TMR sensor element 21 and the second TMR sensor elements 22 are arranged in a first half bridge. The third TMR sensor element 23 and the fourth TMR sensor elements 24 are arranged in a second half bridge. A respective output signal connection VOUT1, VOUT2 is provided at each half bridge.

The TMR sensor elements 21, 22, 23, 24 have a magnetic field-dependent changeable resistance behavior, which is to say they change the electrical resistance based on a prevalent external magnetic field. Hence, the TMR sensor elements 21, 22, 23, 24 are depicted in the form of resistors in the equivalent circuit diagram shown in FIG. 2, with their respective magnetic field-dependent changeable resistance behavior being symbolized using the arrows 31, 32, 33, 34 plotted immediately therebelow. The arrows 31, 32, 33, 34 specify the magnetization direction of the respective pinned layer. In this case, the magnetization directions of the respective pinned layers of the first and second TMR sensor element 21, 22 are aligned antiparallel in each case, and the magnetization directions of the respective pinned layers of the third and fourth TMR sensor element 23, 24 are likewise aligned antiparallel in each case.

The four TMR since elements 21, 22, 23, 24 are identical, which is to say each TMR sensor element 21, 22, 23, 24 has the same electrical resistance in terms of absolute value when no external magnetic field is present, which is to say B=0 T (tesla). Consequently, the same output signal is initially present at both output signal connections VOUT1, VOUT2, with the result that initially no differential voltage sets in at the two output signal connections VOUT1, VOUT2 when no external magnetic field is present. The magnetic operating point thus is at B=0 T.

Since the four TMR sensor elements 21, 22, 23, 24 are identical, the output voltage of the two have bridges is automatically always half of the supply voltage, which is to say VDD/2 is always present at the two output signal connections VOUT1, VOUT2 when no external magnetic field is prevalent. The electrical operating point thus is always at VDD/2.

The previously described configuration of a magnetoresistive sensor 20 leads to the insufficiencies mentioned in the introductory part of the description. Thus, it is for example not easily possible to set the magnetic and/or electrical operating point to other values. However, the innovative concept described herein develops a solution to this problem.

Figure 3A:
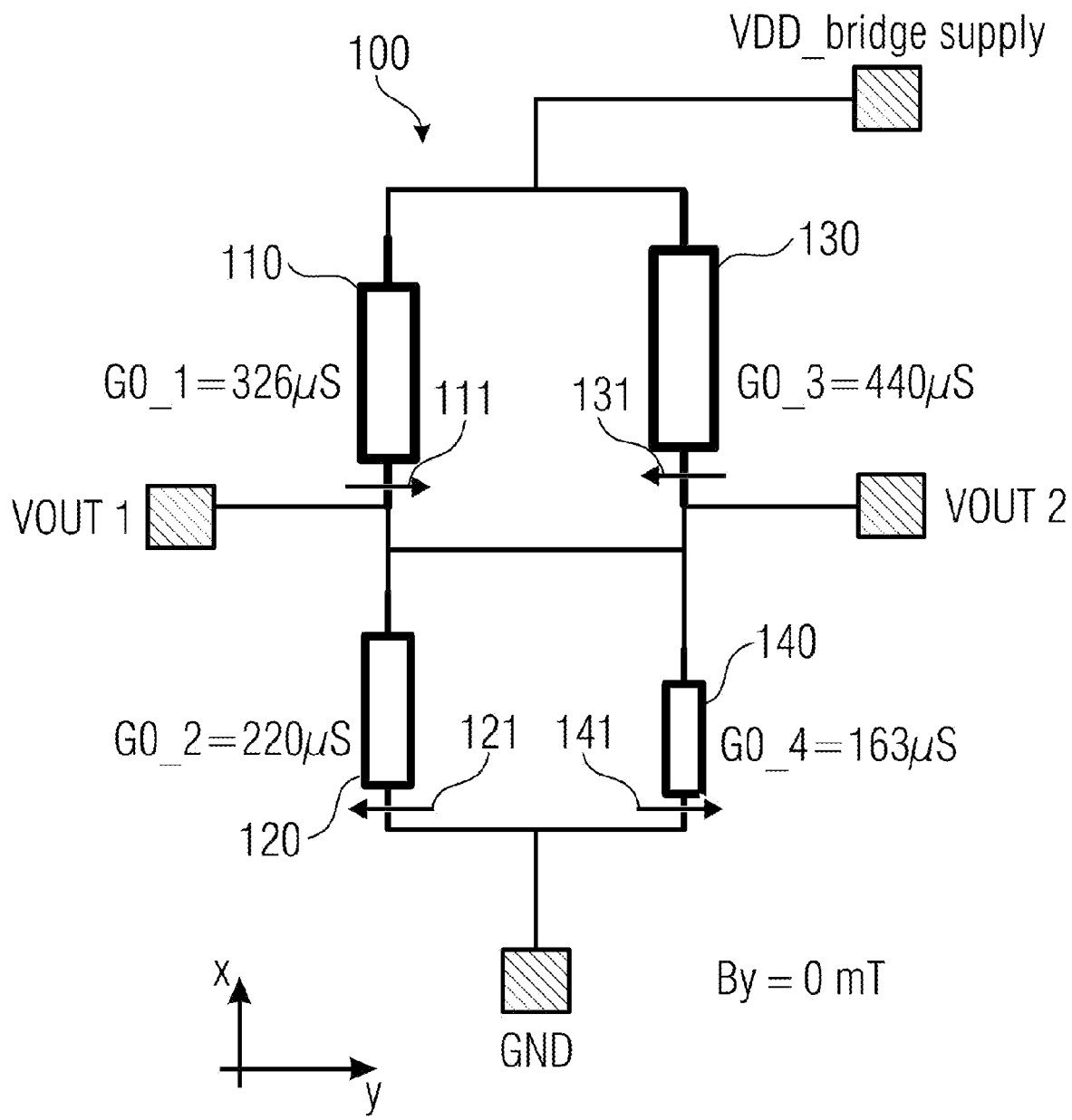
FIG. 3A shows an equivalent circuit diagram of a magnetoresistive sensor according to an example implementation, in which no external magnetic field is present and wherein the Wheatstone bridge is unbalanced.

FIG. 3A shows an equivalent circuit diagram for an example implementation of a magnetoresistive magnetic field sensor 100 according to the innovative concept described herein. The magnetoresistive magnetic field sensor 100 comprises four magnetoresistive elements 110, 120, 130, 140, with each magnetoresistive element 110, 120, 130, 140 experiencing a respective change in conductance in response to an external magnetic field. This is based on the above-described magnetoresistive effects.

The four magnetoresistive elements 110, 120, 130, 140 are arranged in a Wheatstone full bridge circuit. A first magnetoresistive element 110 and a second magnetoresistive element 120, which respectively have an inverse behavior in relation to a change in conductance, are arranged in a first half bridge (the left half bridge in FIG. 3A). That is to say, an increase in the conductance of the first magnetoresistive element 110 in the presence of an external magnetic field is accompanied by a corresponding reduction in the conductance of the second magnetoresistive element 120. This is depicted by the oppositely directed magnetization directions 111, 121 of the respective pinned layer of the respective sensor element 110, 120.

A third magnetoresistive element 130 and a fourth magnetoresistive element 140, which likewise respectively have an inverse behavior in relation to a change in conductance, are arranged in a second half bridge (the right half bridge in FIG. 3A). That is to say, an increase in the conductance of the third magnetoresistive element 130 in the presence of an external magnetic field is accompanied by a corresponding reduction in the conductance of the fourth magnetoresistive element 140. This too is depicted again by the oppositely directed magnetization directions 131, 141 of the respective pinned layer of the respective sensor element 130, 140.

Moreover, the first and the third magnetoresistive element 110, 130 have an inverse behavior in relation to a change in conductance, and the second and the fourth magnetoresistive element 120, 140 have an inverse behavior in relation to a change in conductance.

An external magnetic field may be aligned in-plane, which is to say it can have a magnetic field component in the x-direction and/or a magnetic field component in the y-direction. In this case, the external magnetic field can rotate through 3600 in the x-y-plane. As described above, the magnetization of the free layer of the respective magnetoresistive elements 110, 120, 130, 140 can follow the movement of the external magnetic field in the x-y-plane. As it were, the free layer of the respective magnetoresistive element 110, 120, 130, 140 consequently rotates vis-à-vis its respective fixed pinned layer. As a result, the conductance of the respective magnetoresistive element 110, 120, 130, 140 changes depending on the orientation of the free layer relative to the pinned layer. Hence, the precise rotary angle position of the magnet can be determined. Accordingly, such a magnetoresistive sensor 100 could be configured as a rotary angle sensor.

However, it would likewise be conceivable that the magnetoresistive magnetic field sensor 100 presented herein is configured to detect linear changes of distance. That is to say, the magnetoresistive magnetic field sensor 100 can detect linear movements of a magnet or external magnetic field. A linear movement is a rectilinear movement along a movement direction, preferably in one dimension or with one degree of freedom. In this context, this may be a movement along a line, which is to say the shortest connection between two points.

By way of example, if only one external magnetic field component in one direction dominates (e.g., By in the y-direction) and if the respective free layers of the magnetoresistive elements 110, 120, 130, 140 have a magnetic restoring force (e.g., caused by a shape anisotropy) in order to always assume the same defined magnetic state after the external magnetic field component has been switched off, then this can be used to also determine the field strength of the external magnetic field component. To the extent that an external magnetic field with a predefined magnetic field strength is under consideration, this can be understood to mean the respective magnetic field component (e.g., By) which extends parallel or antiparallel to the detected linear change of distance.

Figure 11:
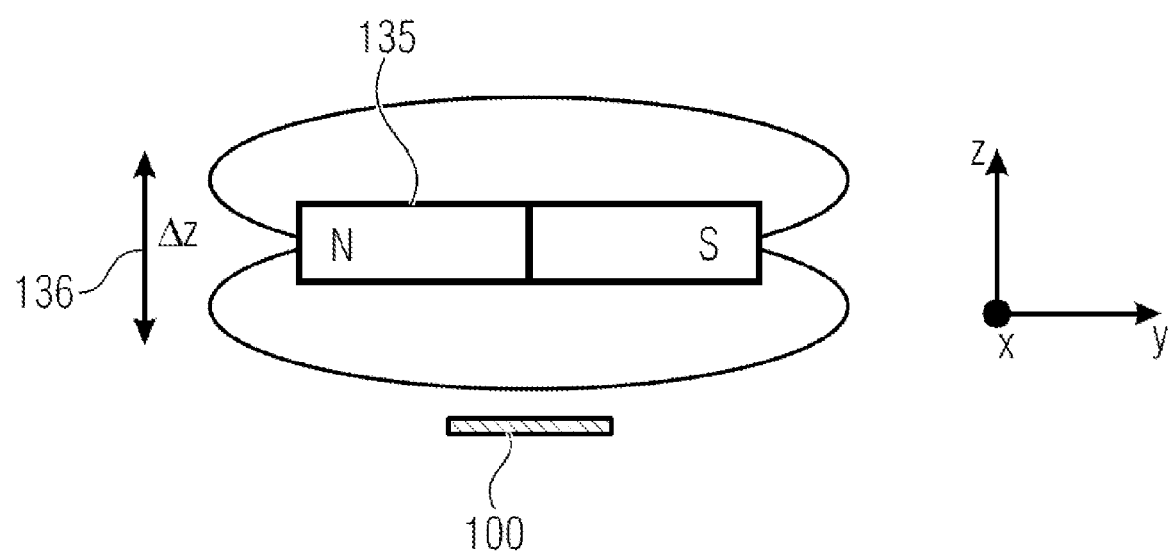
FIG. 11 shows a schematic view of a magnetoresistive magnetic field sensor according to an example implementation, with this magnetoresistive magnetic field sensor being configured to detect linear changes of distance.

FIG. 11 shows an example application for detecting a linear change of a distance, in which a magnet 135, which has an in-plane magnetic field component in the y-direction in relation to the magnetoresistive sensor 100, varies the field strength thereof at the location of the magnetoresistive sensor 100 by way of a movement along the z-axis (see the double-headed arrow 136). The change in signal measured by the magnetoresistive sensor 100 on account of the change in the field strength allows a measurement of the position of the magnet 135 or a measurement of the distance of the magnet 135 from the magnetoresistive sensor 100. As an alternative or in addition, a change in the magnetic field component in the y-direction can likewise be generated at the location of the magnetoresistive sensor 100 by moving the magnet 135 along the y-axis, with the result that it is also possible to detect a linear change in distance of the magnet 135 along the y-axis.

In the non-limiting example of a magnetoresistive sensor 100 depicted in FIG. 3A, the pinned layers of the respective magnetoresistive elements 110, 120, 130, 140 are aligned in the positive and negative y-directions. The alignment or orientation of the pinned layer is also referred to as magnetization direction herein. Should there now be no external magnetic field present in the magnetization direction, which is to say aligned with the pinned layer (in this case: the y-direction), which is to say By=0 mT, then the four magnetoresistive elements 110, 120, 130, 140 have different initial conductance values G0_1, ..., G0_4. In contrast to the conventional magnetoresistive sensors mentioned at the outset, the four magnetoresistive elements 110, 120, 130, 140 according to the example implementations are precisely not identical.

Each magnetoresistive element 110, 120, 130, 140 may have an individual initial conductance G0_x, all of which may differ from one another. The initial conductance G0_x denotes the respective conductance without a prevalent external magnetic field in the magnetization direction, for example for By=0 mT.

In the non-limiting example implementation for an assumed sensitivity of 0.15%/mT shown in FIG. 3A, the first magnetoresistive element 110 has an initial conductance G0_1 of 326 μS at By=0 mT. The second magnetoresistive element 120 has an initial conductance G0_2 of 220 μS at By=0 mT. The third magnetoresistive element 130 has an initial conductance G0_3 of 440 μS at By=0 mT. Additionally, the fourth magnetoresistive element 140 has an initial conductance G0_4 of 163 μS at By=0 mT.

Since the initial conductance values G0_1, ..., G0_4 of all four magnetoresistive elements 110, 120, 130, 140 differ from one another at By=0 mT, the Wheatstone full bridge may also be referred to as an unbalanced Wheatstone full bridge.

The absolute numerical values of the initial conductance values G0_1, ..., G0_4 specified here purely by way of example should not be construed as limiting. They are determined according to the desired magnetic and/or electrical operating point to be set.

Figure 3B:
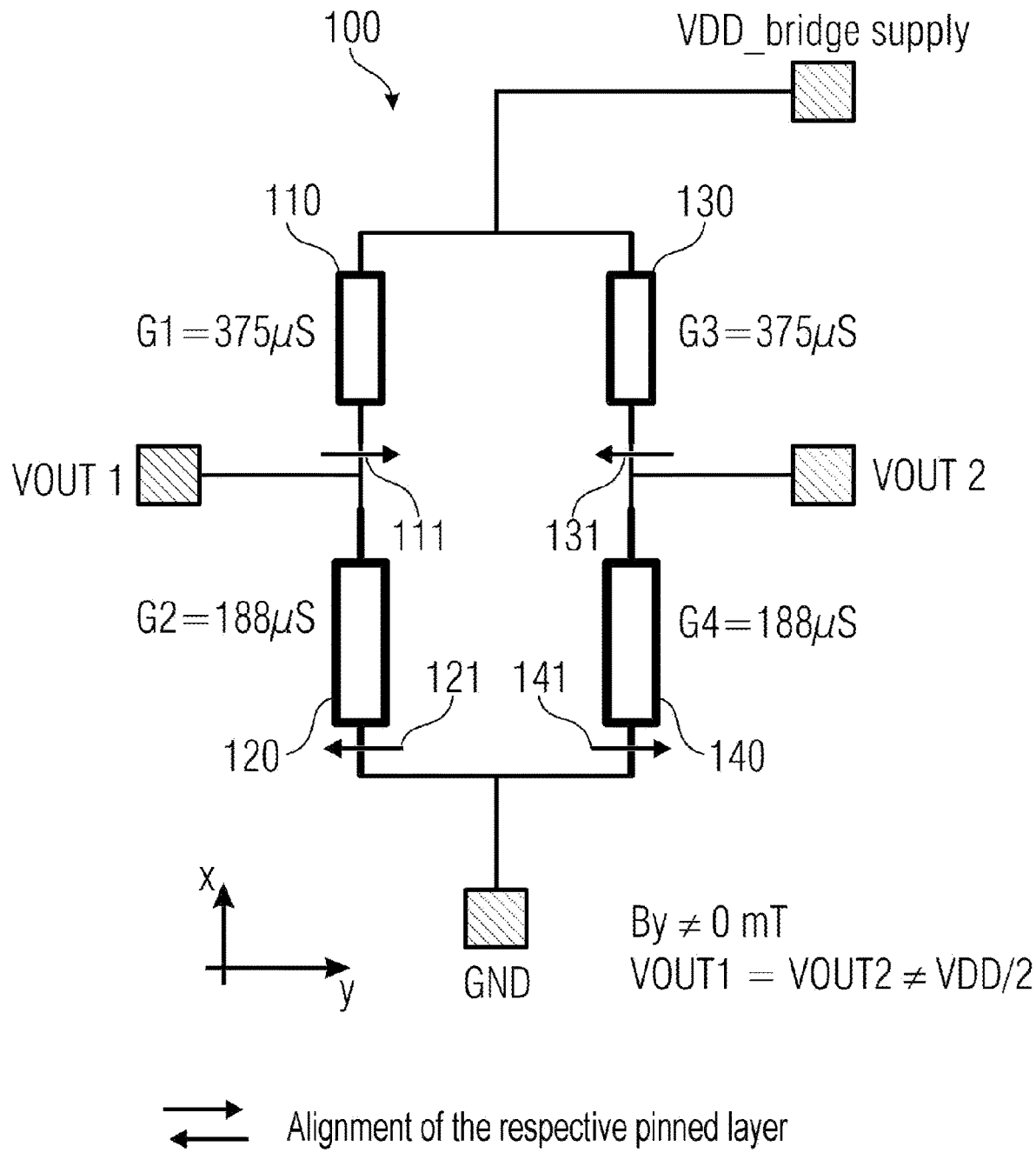
FIG. 3B shows an equivalent circuit diagram of the magnetoresistive sensor from FIG. 3A, wherein an external magnetic field with a predefined magnetic field strength is present and the Wheatstone bridge is balanced, and wherein the magnetic and the electrical operating point are shifted.

FIG. 3B now shows the same equivalent circuit diagram of the magnetoresistive sensor 100, albeit for the case where the external magnetic field has an magnetic field component with a desired non-zero magnetic field strength in the magnetization direction 111, 121, 131, 141 (in this case: in the y-direction), which is to say for By≠0 mT. The desired field strength may denote the field strength value to which the magnetic operating point of the sensor 100 is intended to be shifted. By way of example, this desired field strength can be at By=100 mT, with the result that the magnetic operating point is thus accordingly at By=100 mT. This value, too, is specified purely by way of example and therefore should not be construed as limiting.

As is evident from FIG. 3B, the conductance values G1, G2, G3, G4 of the respective magnetoresistive sensor elements 110, 120, 130, 140 change depending on the orientation of the external magnetic field. The sensor 100 is at the magnetic operating point as soon as the desired value of the magnetic field component has been reached in the magnetization direction 111, 121, 131, 141 (e.g., By≠0 mT=100 mT). In this case, two magnetoresistive elements with an inverse behavior in relation to a change in conductance respectively have the same conductance. In the example shown in FIG. 3B, the first magnetoresistive element 110 and the third magnetoresistive element 130 (with an inverse behavior in relation to a change in conductance in each case) have the same conductance, e.g., G1=G3=375 μS, and the second magnetoresistive element 120 and the fourth magnetoresistive element 140 (with an inverse behavior in relation to a change in conductance in each case) have the same conductance, e.g., G2=G4=188 μS.

In this case, which is to say when the magnetic operating point of the sensor 100 is reached, the Wheatstone full bridge is balanced.

The two half bridges of the Wheatstone full bridge act like a voltage divider, with a first output connection Vout1 being able to be provided in the first half bridge and a second output connection Vout2 being able to be provided in the second half bridge. The same output signal is present at both output connections Vout1 and Vout2 at the magnetic operating point (e.g., at By≠0 mT=100 mT) since the two magnetoresistive elements 110, 120 in the first half bridge each have the same conductance values as the two magnetoresistive elements 130, 140 in the second half bridge. Consequently, the differential signal Vout1−Vout2=0 at the magnetic operating point.

As is evident from FIG. 3B, the common conductance of the first and third magnetoresistive elements 110, 130 (G1=G3=375 μS) may differ from the common conductance of the second and fourth magnetoresistive elements 120, 140

(G2=G4=188 µS) at the magnetic operating point (e.g., at By≠0 mT=100 mT). As a result, an output voltage which differs from ½ VDD is dropped across both output connections Vout1, Vout2. By way of example, an output voltage of ⅔ VDD can be dropped across both output connections Vout1, Vout2 at the magnetic operating point.

Thus, the electrical operating point can also be shifted from ½ VDD to any desired value, for example ⅔ VDD. This value should also be understood to be purely example and is determined according to the magnitudes of the conductance values G1, . . . , G4 of the magnetoresistive elements 110, 120 130, 140 arranged in respective half bridge.

An advantage of the innovative concept described herein lies in the fact that, inter alia, for example the electrical operating point can be shifted purely using a suitable choice of initial conductance values G0_1, . . . , G0_4 for the four magnetoresistive elements 110, 120, 130, 140. Consequently, it is possible to dispense with an additional shift resistor.

Figure 4B:
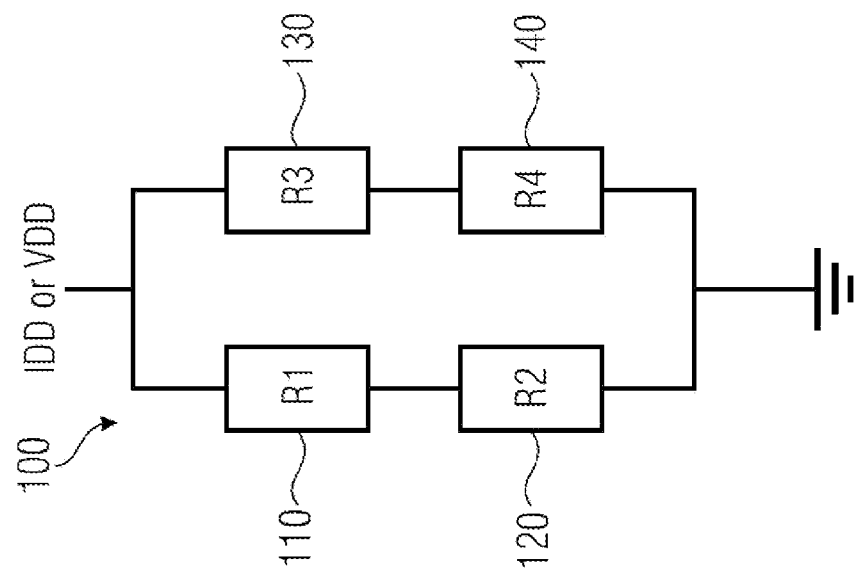
FIG. 4B shows an equivalent circuit diagram of a Wheatstone bridge of a conventional magnetoresistive sensor according to an example implementation with a shifted electrical work point, which does not require an additional shift resistor.
Figure 4A:
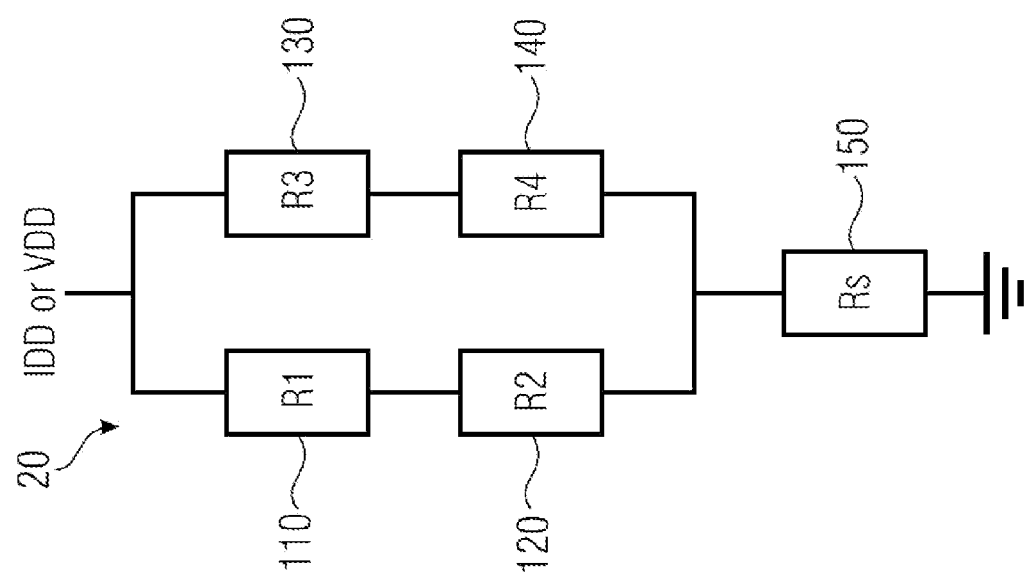
FIG. 4A shows an equivalent circuit diagram of a Wheatstone bridge of a conventional magnetoresistive sensor with an additional shift resistor for shifting the electrical operating point.

In this respect, reference is made to FIGS. 4A and 4B. FIG. 4A shows an equivalent circuit diagram of a conventional magnetoresistive sensor 20. In this case, a shift resistor 150 is provided between the Wheatstone bridge and ground, in order to shift of the electrical operating point.

By comparison, FIG. 4B shows an equivalent circuit diagram of a magnetoresistive magnetic field sensor 100 according to an example implementation. On account of the dimensioning of the initial conductance values G0_1, . . . , G0_4 discussed above, it is possible to shift the electrical operating point even without an additional shift resistor.

Figure 3C:
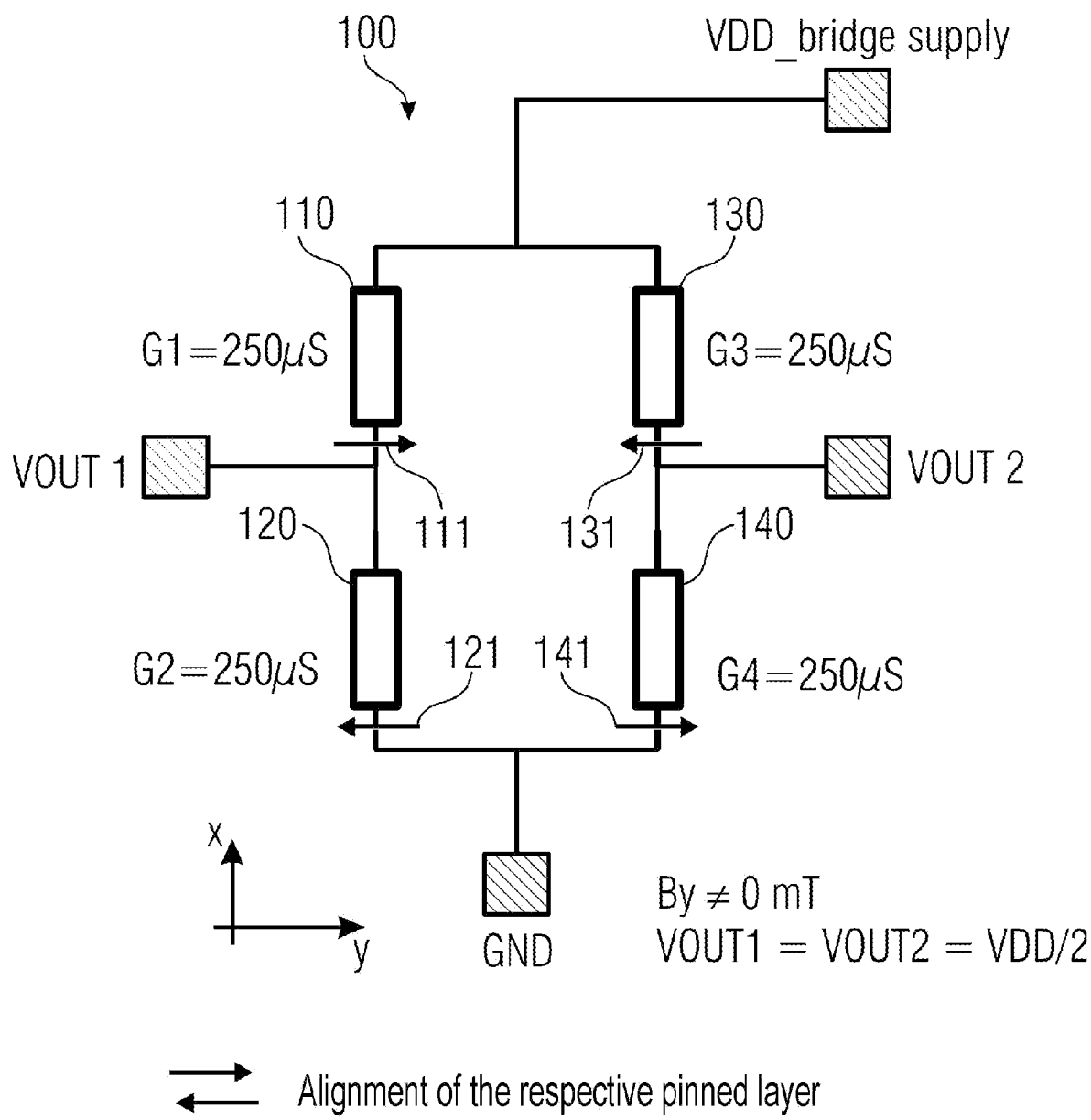
FIG. 3C shows an equivalent circuit diagram of the magnetoresistive sensor from FIG. 3A, wherein an external magnetic field with a predefined magnetic field strength is present and the Wheatstone bridge is balanced, and wherein only the magnetic operating point is shifted.

FIG. 3C shows a further example implementation of a magnetoresistive magnetic field sensor 100 according to the innovative concept described herein. Identical or similar components with the identical or similar functionality as in FIGS. 3A and 3B have been provided with identical reference signs. A contrast to the variant shown in FIG. 3B lies in the fact that all magnetoresistive elements 110, 120, 130, 140 have the same conductance if the magnetic field with the predefined magnetic field strength By≠0 mT is present. In the non-limiting example shown here, all four magnetoresistive elements 110, 120, 130, 140 have the same value of 250 µS by way of example.

As a result, half of the supply voltage ½ VDD is present at each of the two output signal connections Vout1, Vout2. Thus, the electrical operating point has not been shifted in comparison with FIG. 3B. By contrast, the magnetic operating point has also been shifted here to a value By≠0 mT.

In this case, the initial conductance values G0_1, . . . , G0_4 at B=0 T would deviate from the example shown in FIG. 3A. In this case, for example, at B=0 T, a first pair of magnetoresistive elements, each with the same behavior in relation to a change in conductance (e.g., the first and the fourth magnetoresistive element 110, 140) would have a first common conductance (e.g., G1=G4), and a second pair of magnetoresistive elements, each with the same behavior in relation to a change in conductance (e.g., the second and the third magnetoresistive elements 120, 130), would have a different second common conductance (e.g., G2=G3).

In conclusion, the magnetic and/or electrical operating point can be shifted in a simple manner using the innovative magnetoresistive magnetic field sensor 100 described herein.

The magnetoresistive sensor 100 is at the magnetic operating point precisely when the differential voltage across the two output signal connections Vout1 and Vout2 is equal to zero, which is to say Vdiff=Vout1−Vout2=0. This in turn is precisely the case when the external magnetic field has a magnetic field component, for example in the y-direction, with a predefined magnetic field strength not equal to zero, for example By≠0 mT=100 mT. To realize this, the initial conductance values G10_1, . . . , G0_4 of the magnetoresistive elements 110, 120, 130, 140 could each be dimensioned such that the same output voltage drops at both output signal connections Vout1 and Vout2 when the predefined magnetic field strength of By≠0 mT is reached.

By way of example, at least the first magnetoresistive element 110 in the first half bridge and the third magnetoresistive element 130 in the second half bridge may have the same conductance (when the predefined magnetic field strength of By≠0 mT is reached), which is to say G1=G3. At the same time, the second magnetoresistive element 120 in the first half bridge and the fourth magnetoresistive element 140 in the second half bridge may have the same conductance, which is to say G2=G4. The electrical operating point is not shifted if all conductance values G1, . . . , G4 have the same value when the desired magnetic field strength of By≠0 mT is reached, which is to say G1=G2=G3=G4. Accordingly, half the supply voltage is present at each output signal connection Vout1, Vout2, which is to say Vout1=Vout2=½ VDD.

The electrical operating point can be shifted as an alternative or in addition. In this case, the identical conductance values G1=G3 of the first and third magnetoresistive elements 110, 130 differ from the identical conductance values G2=G4 of the second and fourth magnetoresistive elements 120, 140 when the desired magnetic field strength of By≠0 mT is reached. In this case, the output voltages present at both output signal connections Vout1, Vout2 are at a value that differs from ½ VDD, for example at ⅔ VDD in each case.

Figure 5:
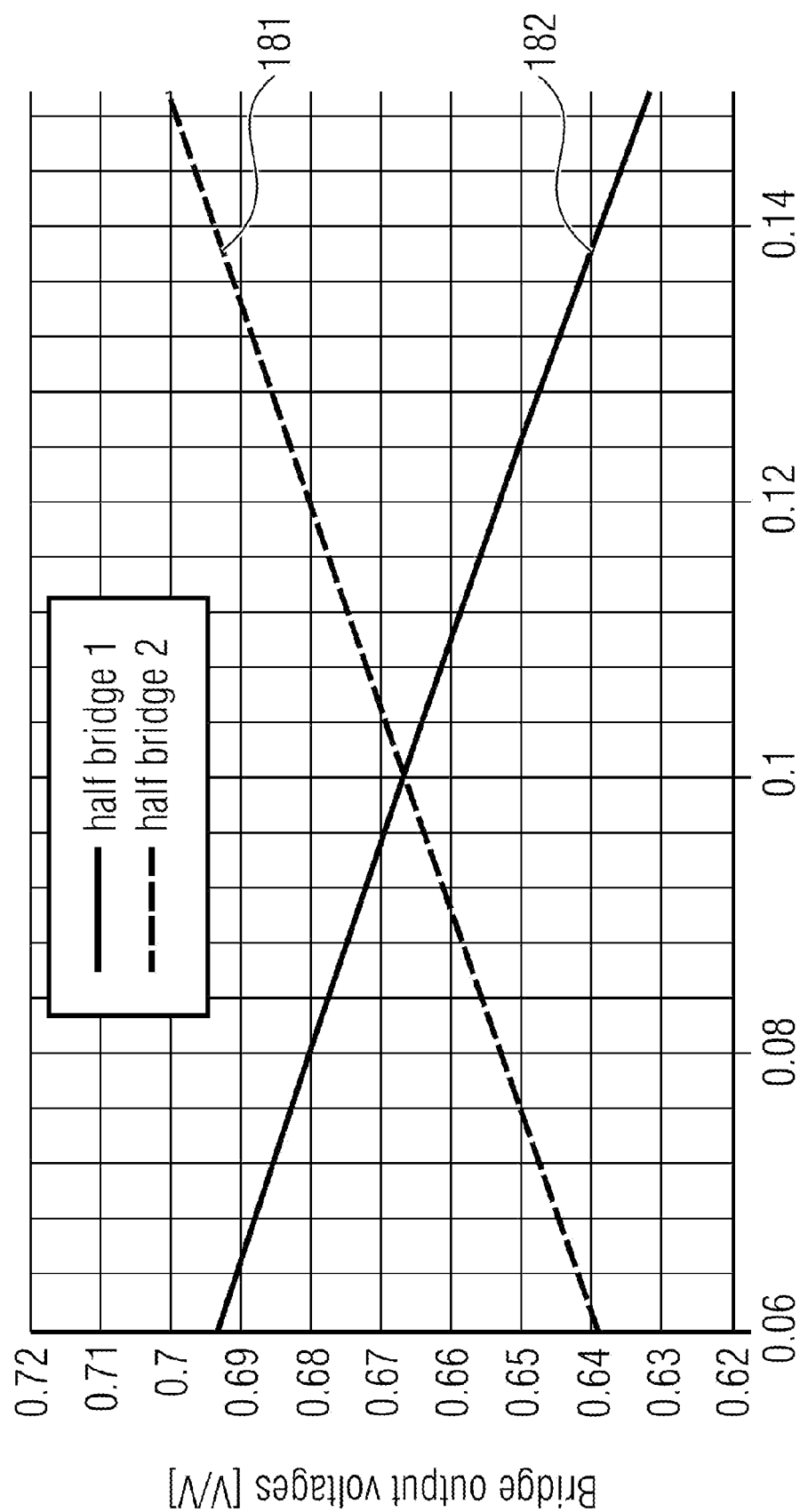
FIG. 5 shows a diagram for displaying the shift of the electrical and magnetic work point.

FIG. 5 shows, by way of example, a diagram for illustrating the shifted magnetic operating point and the electrical operating point. Shown are the output voltages at the two output signal connections Vout1, Vout2 as a function of the field strength of the magnetic field component By directed in the y-direction. The curve 181 shows the output signal at the first output signal connection Vout1. The curve 182 shows the output signal at the second output signal connection Vout2.

The operating point is located at the point where the two curves 181, 182 intersect. It is evident here that the magnetic operating point is located at a magnetic field component with the predefined magnetic field strength of By≠0 T=100 mT. The differential output signal is equal to zero here, which is to say Vdiff=Vout1−Vout2=0.

At the same time, the electrical operating point is also shifted in this case. Assuming a supply voltage VDD of 1 V, the electrical operating point is not at ½ VDD=0.5 V but has been shifted to the example value of VDD=0.667 V (=⅔ VDD), which is to say ⅔ VDD=0.667 V is present at each of the two output signal connections Vout1 and Vout2.

Figure 6:
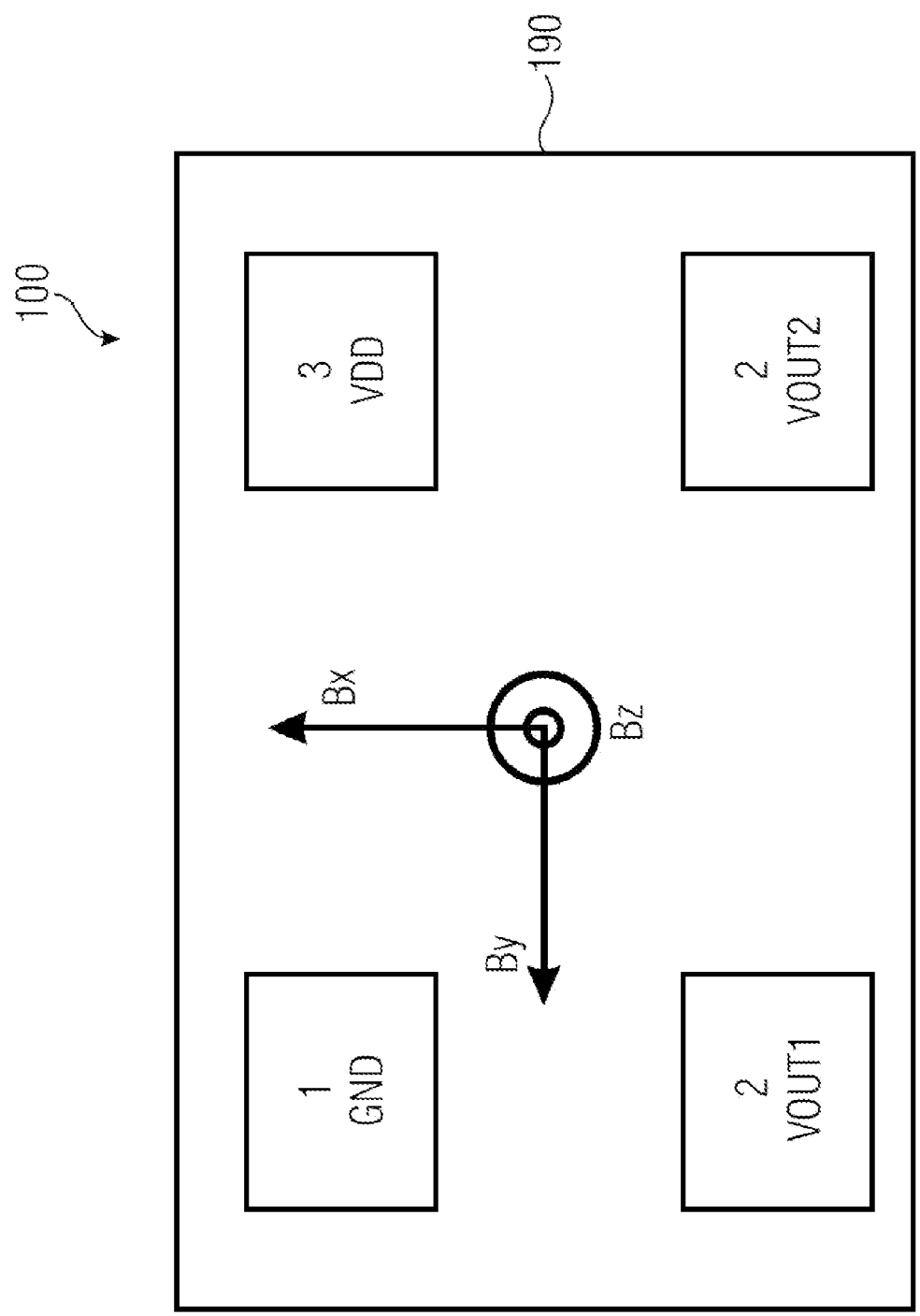
FIG. 6 shows a schematic plan view of an in-plane magnetic field sensor according to an example implementation.

FIG. 6 shows a plan view of a magnetoresistive magnetic field sensor 100 according to an example implementation. Visible here is a chip substrate 190, on which are located a ground connection 1, a supply connection 3, and also a first output signal connection 4 and a second output signal connection 2. The above-described magnetoresistive elements 110, 120, 130, 140 are situated in the Wheatstone full bridge configuration in the center (not visible here).

FIG. 6 shows the aforementioned in-plane magnetic field components Bx and By for illustrative purposes. These are located in the Chip plane of the chip substrate 190. The magnetic field component Bz points out of the chip plane and is therefore also referred to as out of plane.

Accordingly, the innovative magnetic field sensor 100 described herein is configured as an in-plane sensor which measures at least one magnetic field component in the chip plane, for example the magnetic field component By which is oriented in the y-direction. To this end, the respective pinned layer of the used magnetoresistive elements 110, 120, 130, 140 is in each case oriented parallel or antiparallel to the magnetic field component By to be measured.

By way of example, if FIGS. 3A to 3C are reinspected, it is possible to recognize that the alignment of the respective pinned layer (represented by the arrows 111, 121, 131, 141) is in each case oriented parallel or antiparallel to the magnetic field component By to be measured. By way of example, the respective pinned layers of the first and the diagonally opposite fourth magnetoresistive element 110, 140 may each be aligned parallel to the magnetic field component By to be measured (see arrows 111, 141), while the respective pinned layers of the second and the diagonally opposite third magnetoresistive element 120, 130 may in each case be aligned parallel to the magnetic field component By to be measured (see arrows 121, 131).

As already mentioned previously, the initial conductance values G0_1, . . . , G0_4 of the respective magnetoresistive elements 110, 120, 130, 140 depend, inter alia, on the orientation of the respective pinned layer. The sensitivity of the respective magnetoresistive element 110, 120, 130, 140 is a further factor on which the initial conductance values G0_1, . . . , G0_4 depend. A numerical example for this is shown in the table below.

The table specifies resistance values rather than the previously used conductance values. Numerical values for magnetoresistive elements 110, 120, 130, 140 with a sensitivity of S=0.15%/mT are plotted in the first two lines. In comparison therewith, the third and fourth line plot numerical values for magnetoresistive elements 110, 120, 130, 140 with a sensitivity of S=0.20%/mT.

The first line plots the resistance values when no external magnetic field or no magnetic field component is present, which is to say By=0 mT. This corresponds to the initial conductance values G0_1, . . . , G0_4 of the magnetoresistive elements 110, 120, 130, 140. The resistance values or initial conductance values are all different. Consequently, the full bridge is not balanced at By=0 mT.

The second line plots the resistance values for elements with a sensitivity of S=0.15%/mT, for the case where the magnetic field with the predefined magnetic field strength By≠0 mT is present (here: By=47 mT). As described above with reference to FIG. 3B, the conductance values or resistance values of the first magnetoresistive element 110 and third magnetoresistive element 130 are identical. Moreover, the conductance values or resistance values of the second magnetoresistive element 120 and fourth magnetoresistive element 140 are identical. Consequently, the bridge is balanced in the case of the magnetic field with the predefined magnetic field strength of By≠0 mT (in this case: By=47 mT).

The third line of the table plots the resistance values for elements with a sensitivity of S=0.20%/mT, for the case where no external magnetic field or no magnetic field component is present, which to say By=0 mT. This corresponds to the initial conductance values G0_1, . . . , G0_4 of the magnetoresistive elements 110, 120, 130, 140. In this case, too, the individual resistance values or conductance values all differ from one another again.

However, in comparison with the first line, it is evident that the values deviate from one another.

TABLE 1

|  |  | R_1 | R_2 | R_3 | R_4 |
|---|---|---|---|---|---|
| S = 0.15%/mT | R @ B = 0 mT [Ohm] | 3066.7 | 4533.3 | 2266.7 | 6133.3 |
|  | R @ B = 100 mT [Ohm] | 2666.7 | 5333.3 | 2666.7 | 5333.3 |
| S = 0.2%/mT | R @ B = 0 mT [Ohm] | 3200.0 | 4266.7 | 2133.3 | 6400.0 |
|  | R @ B = 100 mT [Ohm] | 2666.7 | 5333.3 | 2666.7 | 5333.3 |

Accordingly, the respective output conductance values G0_1, . . . , G0_4 of the magnetoresistive elements 110, 120, 130, 140 depend not only on the orientation of the respective pinned layer but also on the sensitivity of the magnetoresistive elements 110, 120, 130, 140.

The sensitivity of the magnetoresistive elements 110, 120, 130, 140 initially is an intrinsic property. However, the sensitivity can also be influenced by way of the shaping or geometry of the magnetoresistive elements 110, 120, 130, 140.

Figure 7:
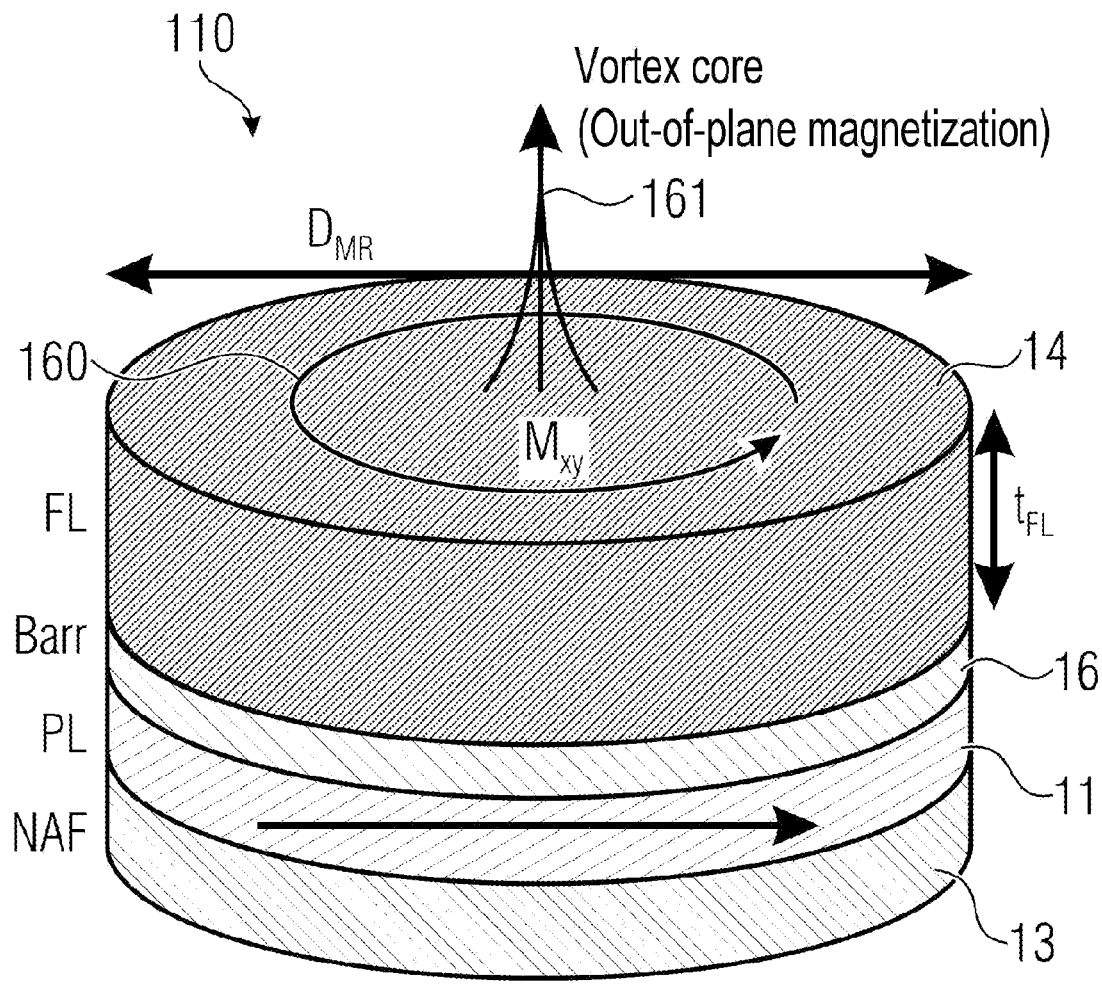
FIG. 7 shows a magnetoresistive element according to an example implementation with a vortex magnetization structure.

FIG. 7 shows an example implementation of a magnetoresistive element 110 with a vortex magnetization structure. The vortex magnetization is an in-plane magnetization with a closed magnetic flux. An advantage of the vortex magnetization lies in the fact that, inter alia, a remagnetization by external magnetic fields is largely hysteresis free. A vortex magnetization is formed in particular in structures with a non-elongate geometry.

The magnetoresistive element 110 depicted here in example fashion has a substantially oval or circular cylindrical shape. Similar what to what was explained hereinabove with reference to FIG. 1, the magnetoresistive element 110 may have a pinned layer (PL) 11, the magnetization direction of which is fixed using the underlying antiferromagnetic layer 13. A free layer (FL) 14 may be arranged above the pinned layer 11, separated by a tunnel barrier layer 16.

The magnetization direction of the free layer 14 is not fixed and can therefore follow the external magnetic field. On account of the round cylindrical shape, a substantially ring-shaped magnetization 160, which may also be referred to as a vortex magnetization, sets-in in the free layer 14 in the initial state, which is to say when no external magnetic field is prevalent. This ring-shaped vortex magnetization 160 is formed in plane, which is to say in the x-y-plane, and has a closed magnetic flux. An out-of-plane magnetic field component 161, which is to say a magnetic field component aligned in the z-direction, which is directed substantially perpendicular to the in-plane vortex magnetization 160, may set in within the ring-shaped vortex magnetization 160.

Under certain boundary conditions, the vortex magnetization state may be an energetically preferred state, which is repeatedly adopted following the application and switch-off of an external magnetic field. This corresponds to an intrinsic restoring force of the free layer which, as already described hereinabove, enables the measurement of the field strength of an externally applied magnetic field.

The magnetoresistive element 110 has a diameter $D_{MR}$. The free layer 14 has a layer thickness $t_{FL}$. In principle, all four magnetoresistive elements 110, 120, 130, 140 can have such a geometry, in which a vortex magnetization structure 160 forms. By way of example, the above-described magnetic sensitivity of the magnetoresistive elements 110, 120, 130, 140 can be adjustable using a variation in the geometric shaping, for example using a variation in the diameter $D_{MR}$ and/or layer thickness $t_{FL}$ of the free layer 14. By varying the sensitivity of the respective magnetoresistive element 110, 120, 130, 140 it is possible to set or define its respective initial conductance value G0_1, . . . , G0_4, as explained hereinabove with reference to the table.

A non-restrictive option of how the initial conductance values of the magnetoresistive elements 110, 120, 130, 140 can be set exactly in order to thus realize an innovative magnetoresistive magnetic field sensor 110 as described herein is described below.

As mentioned in the introductory part of the description, magnetoresistive elements have at least one magnetic tunnel junction—MTJ. The tunnel junction occasionally determines the conductivity or initial conductance (e.g., the conductance at B=0 T) of the respective magnetoresistive element. To exactly set the initial conductance, it is proposed to arrange a plurality of MTJs to form an MTJ array and, if necessary, to interconnect a plurality of MTJ arrays. Moreover, individual MTJs can be deactivated in a targeted manner in order to exactly set the desired conductance or resistance of the respective magnetoresistive element.

Figure 8A:
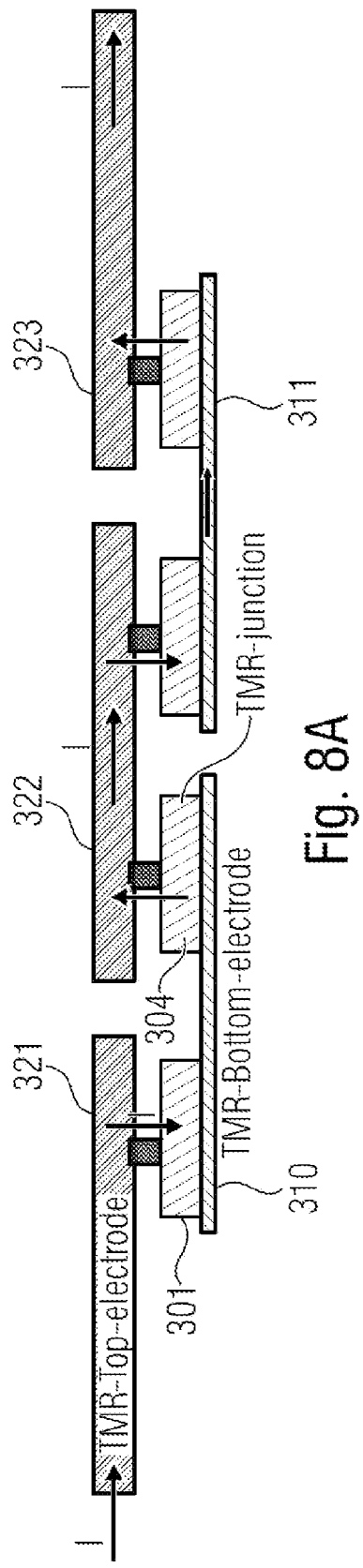
FIG. 8A shows a schematic side view of serially interconnected MTJ arrays according to an example implementation.

FIG. 8A shows a side view and FIG. 8A shows a plan view of such an example implementation of a magnetoresistive element 110. This is explained using the example of a TMR element, but is also valid for other magnetoresistive elements, such as GMR elements, for example.

Figure 8B:
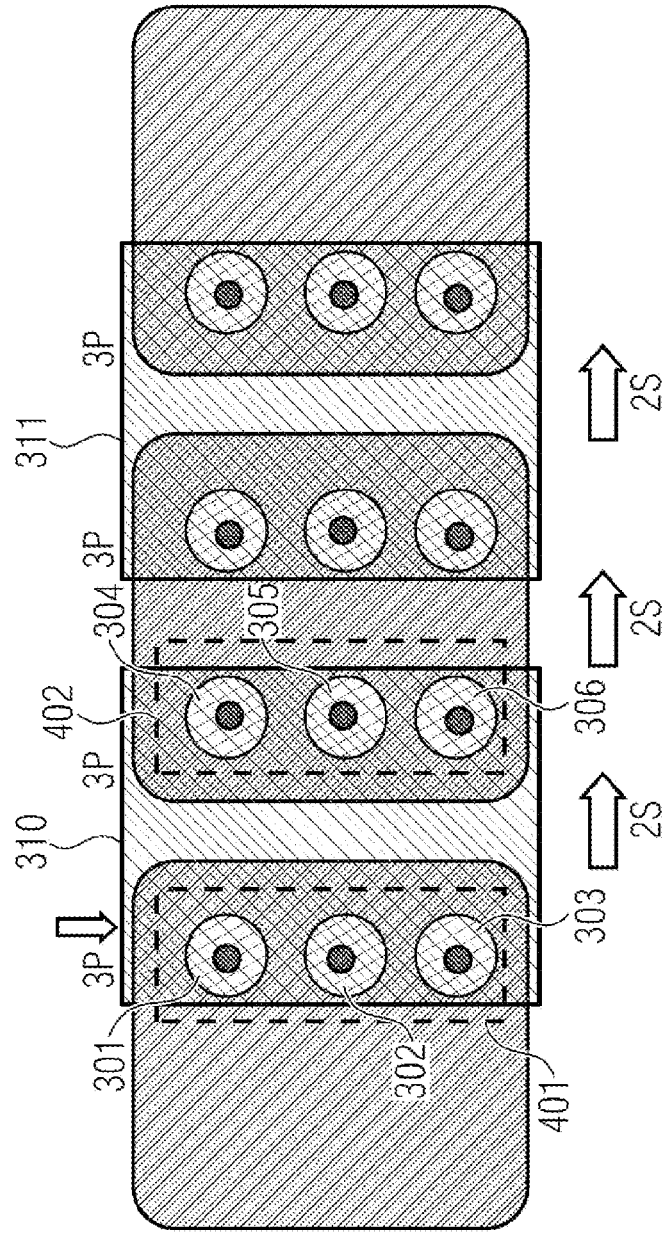
FIG. 8B shows a schematic plan view of the MTJ arrays from FIG. 8A.

A plurality of individual tunnel junctions—MTJs (magnetic tunnel junctions)—301, 302, 303, which is to say at least two, can be interconnected in parallel. In this example, three MTJs 301, 302, 303 are interconnected in parallel, specified by the label 3P in FIG. 8B. In this example, a plurality of MTJs 301, 302, 303 are arranged along a column (from top to bottom). They form a one-dimensional array 401, which may also be referred to as line array.

A plurality of such arrays 401, 402 can be connected in series. In this example, two one-dimensional arrays 401, 402 are interconnected in series, specified by the label 2S in FIG. 8B. The second one-dimensional array 402 depicted here also comprises a plurality of MTJs 304, 305, 306 which are interconnected in parallel.

Both the parallel connection of individual MTJs 301, . . . , 306 to form an array 401, 402 and the serial connection of a plurality of arrays 402, 402 can be implemented using bottom electrodes 310, 311 and top electrodes 321, 322, 323, which respectively contact the individual MTJs 301, 306 on both sides.

The current flow "I" is depicted in FIG. 8A. The current flows horizontally through the electrodes 310, 311, 321, 322, 323 and vertically through the individual MTJs 301, . . . , 306. This corresponds to a CPP (current perpendicular to the plane) configuration.

Figure 9:
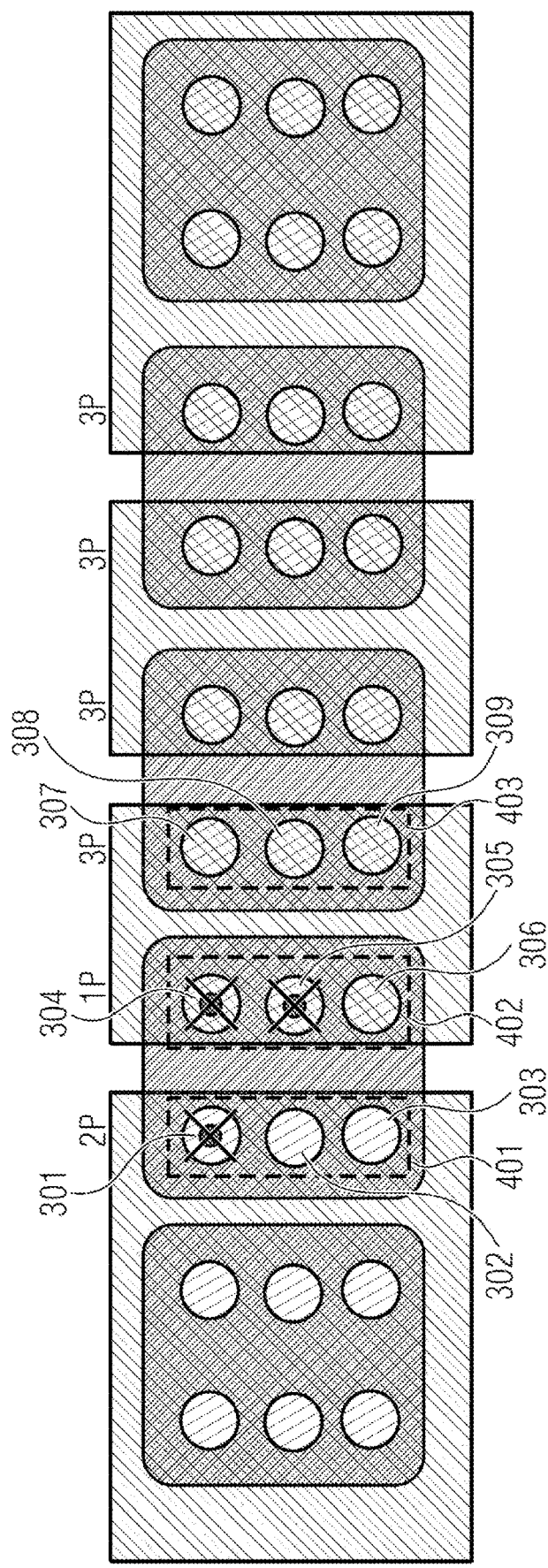
FIG. 9 shows a schematic plan view of serially interconnected MTJ arrays according to an example implementation, with individual MTJs being deactivated in targeted fashion.

FIG. 9 shows a plan view of a plurality of arrays 401, 402, 403, which are interconnected in the manner described above. According to the innovative concept described herein, it is now possible to deactivate individual MTJs in a targeted manner. That is to say the current flow at the respective deactivated MTJ is interrupted in a targeted manner; this MTJ then no longer contributes to the conductivity of the overall array.

In the example shown here, a single MTJ 301 is deactivated in the first array 401; this is depicted here using a cross. Consequently, only two of originally three MTJs are still active in this one-dimensional array 401; this is symbolized by the label "2P".

Further, two individual MTJs 304, 305 are deactivated in the second array 402 in this example, with the result that only one MTJ 306 from originally three MTJs 304, 305, 306 is still active. This is symbolized using the label "1P".

No MTJ is deactivated in a third array 403, which is to say all MTJs 307, 308, 309 are active here.

The overall resistance is then calculated in accordance with the MTJs interconnected in parallel and in series.

Figure 10:
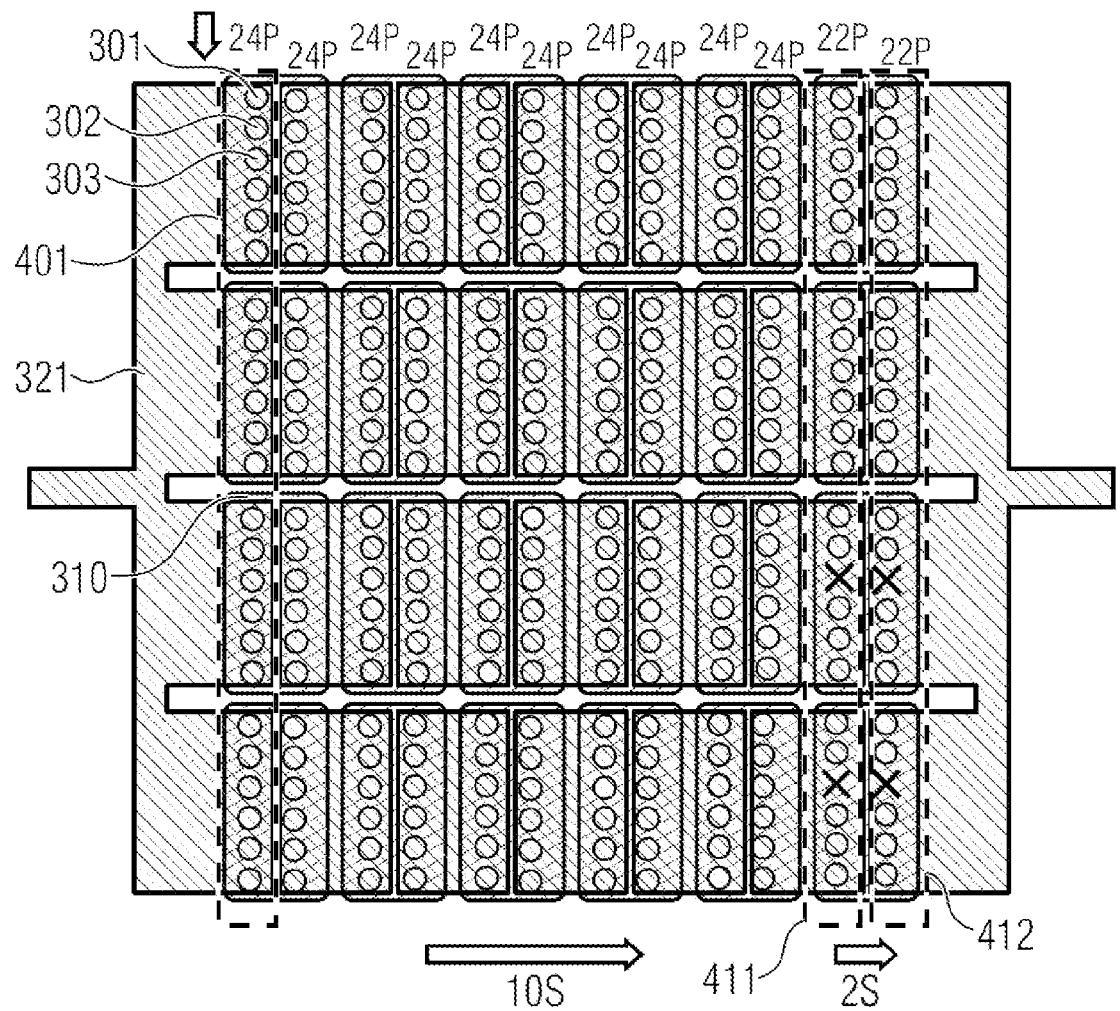
FIG. 10 shows a schematic plan view of a multiplicity of serially interconnected MTJ arrays according to an example implementation, with individual MTJs being deactivated in targeted fashion.

FIG. 10 shows a further example implementation. Here, purely by way of example, twelve one-dimensional arrays 401, 402, . . . , 411, 412 are connected in series in the manner described hereinabove. In this case, each array 401, 402, . . . , 411, 412 respectively has 24 individual MTJs 301, 302, 303, . . . , which are interconnected in parallel in the manner described hereinabove. In this non-limiting example, two MTJs are deactivated in targeted fashion in each of the eleventh and twelfth array 411, 412; this is labeled by crosses. Accordingly, only 22 of originally 24 MTJs are active in each of the eleventh and twelfth array 411, 412.

Using this targeted deactivation of individual MTJs 301, 302, 303, . . . it is possible to exactly set the respective initial conductance G0_1, . . . , G0_4 of a magnetoresistive element 110, 120, 130, 140.

In principle, arrays 401, 402, . . . with any desired number of individual MTJs 301, 302, . . . are possible, which can be interconnected in parallel in the above-described manner. The greater the number of MTJs connected in parallel, the smaller the change in conductance if one MTJ is deactivated and the more exactly a specific conductance value can be set. Moreover, any number arrays 401, 402 are conceivable, which can be interconnected in series in the above-described manner.

The number of active or deactivated MTJs 301, 302, . . . and the number of interconnected arrays 401, 402, . . . is oriented in this case with respect to the desired initial conductance G0_1, . . . , G0_4 of the respective magnetoresistive element 110, 120, 130, 140. In the trials, the targeted deactivation of individual MTJs led to initial conductance values being achieved, which deviated by only 0.02% from the desired initial conductance. In practice, the targeted deactivation of an MTJ can be achieved, for example, by removing the respective MTJ or by removing the electrical contact to the respective MTJ.

Thus, the following can be summarized in this respect: The initial conductance values G0_1, . . . , G0_4 of the respective magnetoresistive elements 110, 120, 130, 140 can be set using different layouts in order to set the desired magnetic and/or electrical operating point. In the above-described innovative approach, a magnetoresistive element may have any desired number of arrays 401, 402, . . . , wherein any desired number of MTJs 301, 302, . . . may be interconnected in parallel and in series. This array approach enables a highly precise relative adaptation of the initial conductance G0_1, . . . , G0_4.

It is observed that, in particular, the relative ratio between the initial conductance values G0_1, . . . , G0_4 of the four magnetoresistive elements 110, 120, 130, 140 plays a role in meeting the precondition Vdiff=0 at a certain magnetic field strength not equal to zero (By≠0 mT), but this does not extend to the respective absolute values of the conductance.

In addition to the relative change in conductance, the magnetoresistive elements 110, 120, 130, 140 should have a defined magnetic sensitivity. In this context, the above-described approach of the vortex magnetization is advantageous since this can be used to set changes in the layout (e.g., diameter $D_{MR}$ of the respective magnetoresistive element) and also adaptations of the overall magnetoresistive element (e.g., variation in the layer thickness $t_{FL}$ of the free layer 14) in a simple manner, in order to set the desired sensitivity of the respective magnetoresistive element 110, 120, 130, 140.

According to the innovative concept proposed here, the shift of the magnetic operating point can be carried out ever more exactly, the more accurately the electrical and magnetic parameters of a magnetoresistive element 110, 120, 130, 140 are set.

By exactly setting the initial conductance $G0\_1, \ldots, G0\_4$ of a magnetoresistive element 110, 120, 130, 140, the above-described magnetoresistive magnetic field sensor 100 can be realized with an unbalanced Wheatstone full bridge at By=0 mT, with the Wheatstone full bridge balancing in the presence of the external magnetic field with the predefined magnetic field strength of By≠0 T (e.g., By=100 mT). The bridge is balanced when in each case a first magnetoresistive element 110, 120 in the first half bridge and a second magnetoresistive element 130, 140, magnetized antiparallel thereto, in the second half bridge have the same conductance, with the result that the same output voltage is present at both half bridges and the differential output signal equals zero, which is to say Vdiff=Vout1−Vout2=0. This describes the magnetic operating point of the magnetoresistive sensor 100. According to the concept described herein, the magnetic operating point can be shifted as desired (within the scope of the maximally possible magnetic measurement range of an individual magnetoresistive element).

If the external magnetic field is present at the predefined magnetic field strength of By≠0 T (e.g., By=100 mT) and if all magnetoresistive elements have the same conductance in the balanced state of the full bridge, then half the supply voltage ½ VDD is present at each of the two output signal connections Vout1, Vout2 of the two half bridges. Thus, the electrical operating point is at ½ VDD in this case. By contrast, if a first pair of magnetoresistive elements 110, 120 has the same conductance and if a second pair of magnetoresistive elements 120, 140 has the same conductance, which differs from the conductance of the first pair 110, 130, then the electrical operating point can be shifted as a result in the manner described above. The electrical operating point can be shifted as desired (within the scope of the ability to load the magnetoresistive elements and within the scope of Ohm's law).

By way of example, the magnetoresistive magnetic field sensor 100 presented herein can be used to measure a linear magnetic field. By way of example, it can be used for optical image stabilization or for focus control in optical systems of smartphones.

In summary, the magnetoresistive magnetic field sensor 100 may inter alia include the following characteristics:

A discrete Wheatstone full bridge. The bridge is unbalanced if the in-plane magnetic field component (e.g., By) to be measured is not present, which is to say By=0 mT; that is to say, all four magnetoresistive elements 110, 120, 130, 140 have different initial conductance values $G0\_1, \ldots, G0\_4$, with the result that the differential output voltage Vdiff is not equal to zero. The bridge is balanced if the in-plane magnetic field component (e.g., By) to be measured is present with a predefined magnetic field strength, which is to say By≠0 mT; that is to say, the magnetoresistive elements 110, 120 in the first half bridge have in sum the same overall conductance as the magnetoresistive elements 130, 140 in the second half bridge, with the result that the differential output voltage Vdiff is equal to zero. The electrical mismatch of the output conductance values $G0\_1, \ldots, G0\_4$ can be chosen so that the full bridge is balanced when the external magnetic field with the predefined field strength of By≠0 mT is present, the latter corresponding to the desired magnetic operating point.

The sensor 100 can be operated at a constant current of for example 250 ρA, leading to supply voltage of VDD~1 V. The sensor 100 may have a shifted electrical operating point, which is to say the output voltage at both have bridges respectively is ≠½ VDD, if the external magnetic field is present with the predefined field strength of B≠0 mT. The sensor 100 may have a shifted electrical operating point, which is to say the differential output voltage is zero, if the external magnetic field is present with the predefined field strength of B≠0 mT.

Two magnetoresistive elements 110, 130 are connected to the supply voltage; two other magnetoresistive elements 120, 140 are connected to ground. The magnetoresistive elements 110, 120, 130, 140 are not identical but electrically different, which is to say all four magnetoresistive elements 110, 120, 130, 140 have different initial conductance values $G0\_1, \ldots, G0\_4$ in the initial state, which is to say at By=0 mT. The two magnetoresistive elements in a respective half bridge have an inverse behavior in relation to a change in conductance in the presence of an external magnetic field; that is to say, the first magnetoresistive element 110 and the second magnetoresistive element 120 in the first half bridge respectively have an inverse behavior in relation to a change in conductance, and the third magnetoresistive element 130 and the fourth magnetoresistive element 140 in the second half bridge each have an inverse behavior in relation to a change in conductance.

A respective magnetoresistive element in the first half bridge and opposite magnetoresistive element in the second half bridge have an inverse behavior in relation to a change in conductance; that is to say, the first magnetoresistive element 110 in the first half bridge and the third magnetoresistive element 130 in the second half bridge respectively have an inverse behavior in relation to a change in conductance, and the second magnetoresistive element 120 in the first half bridge and the fourth magnetoresistive element 140 in the second half bridge each have an inverse behavior in relation to a change in conductance.

If the external magnetic field with the predefined field strength of B≠0 mT is present, then the first and the second magnetoresistive element 110, 120 in the first half bridge together have the same overall conductance as the third and the fourth magnetoresistive element 130, 140 have together in the second half bridge.

The magnetic field sensor 100 can be configured as a linear magnetic in-plane sensor, which is to say the analog output is linear for a specific magnetic field component, for example By. The magnetic field sensor 100 may have a differential analog output Vdiff=Vout1−Vout2. The magnetic field sensor 100 may be based on TMR technology. The mean output voltage Vout1, Vout2 at each half bridge can be identical, and nevertheless not equal to half the supply voltage, in the presence of an external magnetic field with the predefined field strength of B≠0 mT.

The magnetoresistive magnetic field sensor 100 presented herein has inter alia the following advantages:

It is possible to set any desired magnetic operating point (magnetic field at which the differential output voltage is equal to zero), purely by adapting the initial conductance values G0_1, ..., G0_4 of the individual magnetoresistive elements 110, 120, 130, 140.

It is possible to set any desired electrical operating point (mean output voltage at both half bridges), purely by adapting the initial conductance values G0_1, ..., G0_4 of the individual magnetoresistive elements 110, 120, 130, 140.

No shift resistor is required; e.g., the magnetoresistive magnetic field sensor 100 maintains its full sensitivity.

The magnetoresistive magnetic field sensor 100 has little complexity and simultaneously a high signal strength.

The above-described example are merely an illustration of the principles of the innovative concept described herein. It is to be understood that modifications and variations of the arrangements and details described in this document will be obvious to others skilled in the art. For this reason, the concept described herein is intended to be limited merely by the scope of protection of the following patent claims rather than by the specific details which have been presented based on the description and the explanation of the example implementation in this document.

Although some aspects have been described in connection with an apparatus, it is to be understood that the aspects also constitute a description of the corresponding method, with the result that a block or a structural element of an apparatus should also be understood to be a corresponding method step or a feature of a method step. Analogously herewith, aspects which were described in connection with a or as a method step also represent a description of a corresponding block or detail or feature of a corresponding apparatus.

The invention claimed is:

1. A magnetoresistive magnetic field sensor, comprising:
a first magnetoresistive element, a second magnetoresistive element, a third magnetoresistive element, and a fourth magnetoresistive element, with each of the first magnetoresistive element, the second magnetoresistive element, the third magnetoresistive element, and the fourth magnetoresistive element experiencing a respective change in conductance in response to an external magnetic field,
the four magnetoresistive elements being arranged in a Wheatstone full bridge circuit,
the first magnetoresistive element and the second magnetoresistive element, which respectively have an inverse behavior in relation to a change in conductance, being arranged in a first half bridge, and
the third magnetoresistive element and the fourth magnetoresistive element, which respectively have an inverse behavior in relation to a change in conductance, being arranged in a second half bridge,
the first magnetoresistive element, the second magnetoresistive element, the third magnetoresistive element, and the fourth magnetoresistive element having at least two different conductance values when no external magnetic field is present,
with in each case, two of the first magnetoresistive element, the second magnetoresistive element, the third magnetoresistive element, and the fourth magnetoresistive element having a same conductance if an external magnetic field with a predefined magnetic field strength is present.

2. The magnetoresistive magnetic field sensor as claimed in claim 1, wherein the first magnetoresistive element and the third magnetoresistive element respectively have an inverse behavior in relation to a change in conductance, and
wherein the second magnetoresistive element and the fourth magnetoresistive element respectively have an inverse behavior in relation to a change in conductance.

3. The magnetoresistive magnetic field sensor as claimed in claim 1,
wherein the first magnetoresistive element and the third magnetoresistive element respectively have a same conductance if the external magnetic field with the predefined magnetic field strength is present, and
wherein the second magnetoresistive element and the fourth magnetoresistive element respectively have a same conductance if the external magnetic field with the predefined magnetic field strength is present.

4. The magnetoresistive magnetic field sensor as claimed in claim 1,
wherein the first half bridge comprises a first output connection and the second half bridge comprises a second output connection, and
wherein a differential output voltage between the first output connection and the second output connection is zero when the external magnetic field with the predefined magnetic field strength is present.

5. The magnetoresistive magnetic field sensor as claimed in claim 4, wherein the first magnetoresistive element, the second magnetoresistive element, the third magnetoresistive element, and the fourth magnetoresistive element have a same conductance when the external magnetic field with the predefined magnetic field strength is present, with a result that an output signal at the first output connection and an output signal at the second output connection each equal one half of a supply voltage when the external magnetic field with the predefined magnetic field strength is present.

6. The magnetoresistive magnetic field sensor as claimed in claim 4, wherein when no external magnetic field is present the two different conductance values of the first magnetoresistive element and the third magnetoresistive element differ from the two different conductance values of the second magnetoresistive element and the fourth magnetoresistive element, with a result that an output signal of the first output connection and an output signal of the second output connection are not equal to one half of a supply voltage in each case when the external magnetic field with the predefined magnetic field strength is present.

7. The magnetoresistive magnetic field sensor as claimed in claim 1, wherein the first magnetoresistive element and the third magnetoresistive element are each connected to a supply connection, and
wherein the second magnetoresistive element and the fourth magnetoresistive element are each connected to a ground connection.

8. The magnetoresistive magnetic field sensor as claimed in claim 7, wherein no ohmic resistor is arranged between one or more of:
the Wheatstone full bridge circuit and the supply connection, or
the Wheatstone full bridge circuit and the ground connection.

9. The magnetoresistive magnetic field sensor as claimed in claim 1, wherein the magnetoresistive magnetic field sensor is configured as an in-plane sensor which measures a magnetic field component in a chip plane, and
wherein the first magnetoresistive element, the second magnetoresistive element, the third magnetoresistive element, and the fourth magnetoresistive element each have a pinned layer which is oriented parallel or antiparallel to the magnetic field component to be measured.

10. The magnetoresistive magnetic field sensor as claimed in claim 1, wherein the magnetoresistive magnetic field sensor is configured to detect linear changes of distance.

11. The magnetoresistive magnetic field sensor as claimed in claim 1, wherein each the first magnetoresistive element, the second magnetoresistive element, the third magnetoresistive element, and the fourth magnetoresistive element has an individual initial conductance, with the individual initial conductance denoting the respective conductance without a prevalent external magnetic field, and
    wherein respective individual initial conductance values of the first magnetoresistive element, the second magnetoresistive element, the third magnetoresistive element, and the fourth magnetoresistive element depend on:
        an orientation of a pinned layer of the respective magnetoresistive element, and
        a sensitivity of the respective magnetoresistive element.

12. The magnetoresistive magnetic field sensor as claimed in claim 1, wherein the first magnetoresistive element, the second magnetoresistive element, the third magnetoresistive element, and the fourth magnetoresistive element are respectively configured as TMR elements.

13. The magnetoresistive magnetic field sensor (100) as claimed in claim 12, wherein each TMR element, of the TMR elements, comprises a plurality of MTJ arrays with in each case a multiplicity of MTJs, a number and a connection of which determine an initial conductance of the respective TMR element,
    wherein the MTJs on an individual MTJ array are interconnected in parallel and the plurality of MTJ arrays are interconnected in series, and
    wherein the initial conductance of the respective TMR element adjustable using a targeted deactivation of individual MTJs of one or more of the plurality of MTJ arrays.

14. The magnetoresistive magnetic field sensor as claimed in claim 13, wherein a free magnetic layer of each TMR element has a vortex magnetization structure with a closed flux in a plane in an initial state without a prevalent external magnetic field, and
    wherein a magnetic sensitivity of the TMR elements is adjustable using a variation in a geometric shaping using one or more of:
        a variation in a diameter $D_{MR}$ of the free magnetic layer of the respective TMR element, or
        a variation in a layer thickness $t_{FL}$ of the free magnetic layer of the respective TMR element.

\* \* \* \* \*